(12) United States Patent
Rotschild et al.

(10) Patent No.: US 12,494,697 B2
(45) Date of Patent: Dec. 9, 2025

(54) HEAT-TRANSFER-LIQUID-OPERATED TURBINE AND COMPRESSOR

(71) Applicant: TECHNION RESEARCH & DEVELOPMENT FOUNDATION LIMITED, Haifa (IL)

(72) Inventors: Carmel Rotschild, Haifa (IL); Joseph Cassell, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 31 days.

(21) Appl. No.: 18/289,474

(22) PCT Filed: Mar. 9, 2022

(86) PCT No.: PCT/IL2022/050264
§ 371 (c)(1),
(2) Date: Nov. 3, 2023

(87) PCT Pub. No.: WO2022/234554
PCT Pub. Date: Nov. 10, 2022

(65) Prior Publication Data
US 2024/0243639 A1 Jul. 18, 2024

Related U.S. Application Data

(63) Continuation-in-part of application No. PCT/IL2021/051061, filed on Aug. 30, 2021.
(Continued)

(51) Int. Cl.
*B01D 53/14* (2006.01)
*B01D 53/92* (2006.01)
(Continued)

(52) U.S. Cl.
CPC ....... *H02K 7/1823* (2013.01); *B01D 53/1475* (2013.01); *B01D 53/92* (2013.01);
(Continued)

(58) Field of Classification Search
CPC .. H02K 7/1823; B01D 53/1475; B01D 53/92; F02C 6/18
See application file for complete search history.

(56) References Cited

U.S. PATENT DOCUMENTS 3,548,016 A * 12/1970 Sze ........................... C01B 7/03
570/235
4,990,168 A * 2/1991 Sauer ...................... C01B 32/50
62/929
(Continued)

OTHER PUBLICATIONS

Espen Olsen. et al., "Carbon capture in molten salts," Energy Science and Engineering, vol. 1, Issue 3, pp. 144-150 (2013).
(Continued)

*Primary Examiner* — Pedro J Cuevas
(74) *Attorney, Agent, or Firm* — Maschoff Brennan

(57) ABSTRACT

An energy storage and retrieval system including an air chamber, a first air compressor operating with Heat Transfer Liquid (HTL-compressor) connected to the air chamber, a second turbine, operating with Heat Transfer Liquid (HTL-turbine) connected to the air chamber, accepting compressed air from the air chamber and producing work. Related apparatus and methods are also described.

11 Claims, 19 Drawing Sheets

Related U.S. Application Data

(60) Provisional application No. 63/289,197, filed on Dec. 14, 2021, provisional application No. 63/184,928, filed on May 6, 2021.

(51) Int. Cl.
 *F02C 6/18* (2006.01)
 *H02K 7/18* (2006.01)

(52) U.S. Cl.
 CPC .......... *F02C 6/18* (2013.01); *B01D 2251/304* (2013.01); *B01D 2251/306* (2013.01); *B01D 2251/402* (2013.01); *B01D 2251/404* (2013.01); *B01D 2251/602* (2013.01); *B01D 2251/606* (2013.01); *B01D 2257/504* (2013.01); *B01D 2258/01* (2013.01)

(56) References Cited

U.S. PATENT DOCUMENTS

| | | | |
|---|---|---|---|
| 5,598,700 A | 2/1997 | Varshay et al. | |
| 5,724,805 A * | 3/1998 | Golomb | F02C 6/06 60/39.463 |
| 6,648,944 B1 * | 11/2003 | Baker | B01D 53/225 96/9 |
| 8,674,532 B2 * | 3/2014 | Wei | F22B 1/006 290/2 |
| 9,562,521 B2 | 2/2017 | Yogev | |
| 9,782,718 B1 * | 10/2017 | Baker | B01D 53/22 |
| 10,464,014 B2 * | 11/2019 | Baker | F02C 3/00 |
| 11,927,117 B2 * | 3/2024 | Rotschild | F01K 27/005 |
| 11,975,813 B1 * | 5/2024 | Løseth | B63B 35/44 |
| 2010/0314297 A1 * | 12/2010 | Varadaraj | C10G 50/02 208/208 R |
| 2010/0320120 A1 * | 12/2010 | Siskin | C10G 47/22 208/427 |
| 2012/0274078 A1 * | 11/2012 | Wei | B01J 8/067 290/1 R |
| 2014/0238236 A1 * | 8/2014 | Inui | B01D 53/1475 95/173 |
| 2014/0374109 A1 * | 12/2014 | Denton | F02C 7/18 166/309 |
| 2015/0033724 A1 | 2/2015 | Fong et al. | |
| 2016/0059179 A1 * | 3/2016 | Billings | B01D 53/1493 423/220 |
| 2016/0369674 A1 | 12/2016 | Younes et al. | |
| 2017/0082123 A1 | 3/2017 | Momen et al. | |
| 2018/0133642 A1 * | 5/2018 | Baker | B01D 53/005 |
| 2021/0071687 A1 | 3/2021 | Shillinger et al. | |
| 2023/0279787 A1 * | 9/2023 | Rotschild | F01K 27/005 60/670 |
| 2024/0159166 A1 * | 5/2024 | Conlon | F01K 15/00 |
| 2024/0200474 A1 * | 6/2024 | Rotschild | F01K 27/005 |
| 2024/0286729 A1 * | 8/2024 | Løseth | B63B 35/44 |

OTHER PUBLICATIONS

Alon Gany., "Innovative Concepts for High-Speed Underwater Propulsion," International Journal of Energetic Materials and Chemical Propulsion, vol. 17, Issue 2, pp. 83-109 (2018).

Jiarui Zhang et al., "Predicted performance of a two-phase underwater ramjet with a Laval nozzle," Proceedings of the Institution of Mechanical Engineers Part M Journal of Engineering for the Maritime Environment, (2018).

Nachum E. Eisen et al., "Theoretical Performance Evaluation of a Marine Solid Propellant Water-Breathing Ramjet Propulsor," Journal of Marine Science and Engineering, vol. 8, (2020).

Herman D. Haustein. et al., "Multiphase Marine Ramjet Using Liquefied Gas as a Source of Bubbles," Journal of Marine Science and Engineering, vol. 8, (2020).

* cited by examiner

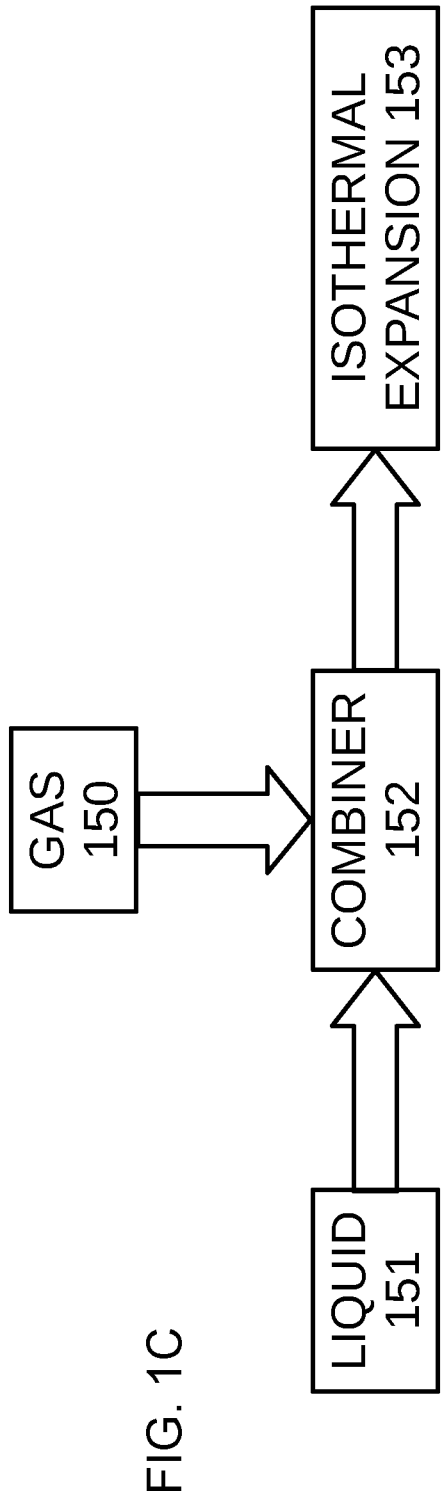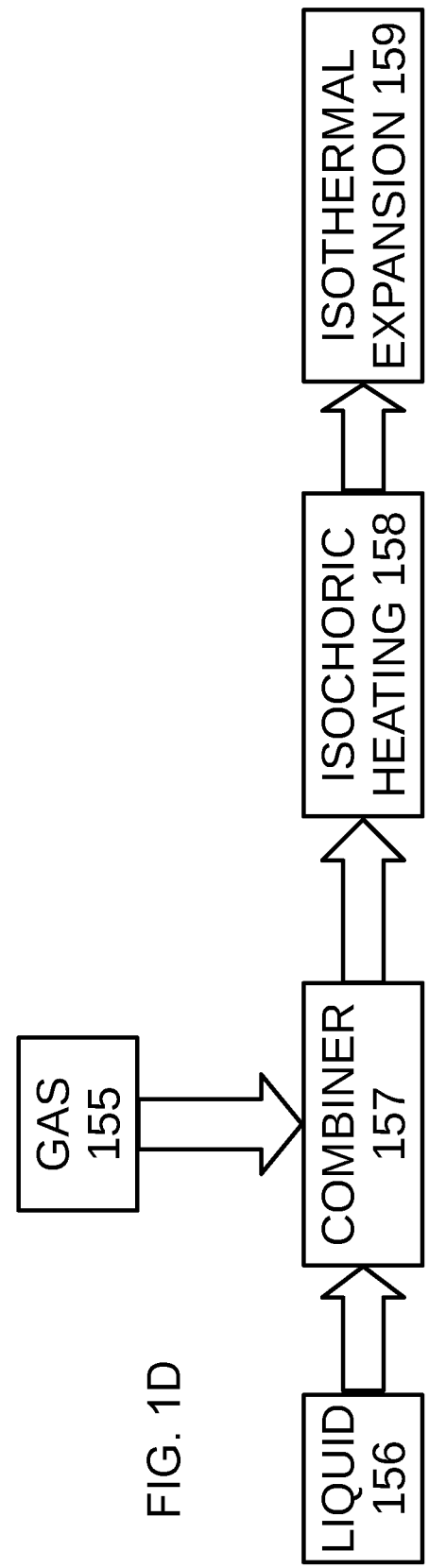

360 — MAINTAIN A FLOW OF HEAT TRANSFER LIQUID (HTL) AT A PRESSURE HIGHER THAN AMBIENT PRESSURE ALONG A CIRCULAR FLOW PATH AROUND A CLOSED-LOOP-SHAPED FLOW CHAMBER, INCLUDING:

362 — CAUSE THE HTL TO FLOW THROUGH A NARROW CROSS-SECTION VENTURI PROFILE OF THE FLOW CHAMBER, CAUSING A REDUCTION OF PRESSURE OF THE FLOWING HTL BELOW AMBIENT PRESSURE WITHIN THE VENTURI PROFILE

364 — PROVIDE GAS TO BE SUCKED INTO THE VENTURI PROFILE OF THE FLOW CHAMBER TO MIX WITH THE HTL

366 — BLEED OFF PRESSURIZED GAS THROUGH A PRESSURE VALVE AT A NON-VENTURI SECTION OF THE FLOW CHAMBER

HEAT-TRANSFER-LIQUID-OPERATED TURBINE AND COMPRESSOR

RELATED APPLICATIONS

This application is a Continuation-In-Part of U.S. Provisional Patent Application No. 63/289,197, filed on Dec. 14, 2021, which is a Continuation-In-Part of PCT Patent Application IL2021/051061 filed on Aug. 30, 2021, which is a Continuation-In-Part of U.S. Provisional Patent Application No. 63/184,928, filed on May 6, 2021, which is a Continuation-In-Part of U.S. Provisional Patent Application No. 63/074,485, filed on Sep. 4, 2020, the contents of which are all incorporated by reference as if fully set forth herein in their entirety. The contents of all of the above applications are incorporated by reference as if fully set forth herein.

FIELD AND BACKGROUND

The present disclosure, in some embodiments thereof, relates to a method and to devices for mixing gas and liquid and producing work and/or compressing the gas.

Additional background art includes:
U.S. Pat. No. 9,562,521 to Yogev.
U.S. Pat. No. 5,598,700 to Varshay et al.
U.S. Patent Application Publication Number 2017/0082123 of Momen et al.
an article titled "Multiphase Marine Ramjet Using Liquified Gas as a Source of Bubbles" by Herman D. Haustein, Alon Gany and Ezra Elias, published in Journal of Marine Science and Engineering 2020, 8, 710; doi: 10.3390/jmse8090710.
an article titled "Innovative Concepts for High-Speed Underwater Propulsion" by Alon Gany, published in International Journal of Energetic Materials and Chemical Propulsion, 17(2):83-109 (2018); and
an article titled "Theoretical Performance Evaluation of a Marine Solid Propellant Water-Breathing Ramjet Propulsor" by Nachum E. Eisen and Alon Gany published in *J. Mar. Sci. Eng.* 2020, 8, 8; doi: 10.3390/jmse8010008.
An article titled "Carbon capture in molten salts" by Espen Olsen and Victorija Tomkute, published in Energy Science and Engineering 2013; 1(3): 144-150, doi: 10.1002/ese3.24).
An article titled "Predicted performance of a two-phase underwater ramjet with a Laval nozzle" by Jiarui Zhang, Zhixun Xia, Liya Huang, Likun Ma, Published in Proceedings of the Institution of Mechanical Engineers Part M Journal of Engineering for the Maritime Environment, September 2018, DOI: 10.1177/1475090218795585.

The disclosures of all references mentioned above and throughout the present specification, as well as the disclosures of all references mentioned in those references, are hereby incorporated herein by reference.

SUMMARY

The present disclosure, in some embodiments thereof, relates to a method and to devices for mixing gas and liquid and producing work and/or compressing the gas.

The terms "water", "liquid" and "Heat Transfer Liquid (HTL)" in all their grammatical forms is used throughout the present specification and claims to mean a liquid—whether water, molten metal, or any other material in liquid form.

The terms "gas" and "air" in all their grammatical forms is used throughout the present specification and claims to mean a gas—whether air, vapor or any other material in gaseous form.

The term "isothermal" is used throughout the present specification and claims to mean with 50 degrees Kelvin.

The term "isochoric", which means constant-volume, is used throughout the present specification and claims to mean within 10% volume change.

The term "quasi isochoric", is used throughout the present specification and claims to mean within 25% volume change.

According to an aspect of some embodiments of the present disclosure there is provided an energy storage and retrieval system including an air chamber, a first air compressor operating with Heat Transfer Liquid (HTL-compressor) connected to the air chamber, a second turbine, operating with Heat Transfer Liquid (HTL-turbine) connected to the air chamber, accepting compressed air from the air chamber and producing work.

According to some embodiments of the disclosure, the HTL of the first air compressor is water.

According to some embodiments of the disclosure, the HTL of the second turbine is water.

According to some embodiments of the disclosure, the HTL-turbine is configured to transfer water from the HTL-turbine to the HTL compressor.

According to some embodiments of the disclosure, the HTL-compressor is configured to transfer water from the HTL-compressor to the HTL-turbine.

According to some embodiments of the disclosure, the HTL-turbine is configured to transfer water from the HTL-turbine to a refrigeration system.

According to some embodiments of the disclosure, the HTL-compressor is configured to transfer water from the HTL-compressor to a heating system.

According to some embodiments of the disclosure, the HTL-compressor includes a plurality of nozzles for mixing air and HTL and ejecting a mixture of the air and HTL.

According to some embodiments of the disclosure, the HTL-compressor includes a closed chamber including a Heat Transfer Liquid (HTL) feed, gathering HTL from the chamber and feeding the HTL into a plurality of rotating arms, each arm including a passage enabling flow of the HTL, one or more gas feed(s), enabling gas entrance into the chamber, and providing gas into the rotating arms, a nozzle attached to each arm, the nozzles accepting a mixture of HTL and gas and enabling exit of the mixture at an end of the nozzle.

According to some embodiments of the disclosure, the HTL-compressor is configured so that a gas-and-HTL mix exiting the nozzle exits at approximately zero speed relative to a body of the HTL-compressor.

According to some embodiments of the disclosure, the HTL-compressor is configured so that a gas-and-HTL mix exiting the nozzle exits with a kinetic energy no more than 25% of energy input into the HTL-compressor.

According to some embodiments of the disclosure, the HTL-compressor includes a closed-loop-shaped flow chamber including a Heat Transfer Liquid (HTL) pump, pumping HTL in a first direction along the chamber, a gradually narrowing cross section which provides a Venturi effect for the HTL flowing along the chamber, a gas feed, enabling gas entrance into the gradually narrowing cross section, a broadening cross section following the narrowing cross section, and a gas exit, for bleeding off pressurized gas, wherein, when HTL flows along the chamber, when the HTL reaches the gradually narrowing cross section, flow of the HTL is accelerated and pressure of the HTL is lowered due to the Venturi effect, thereby sucking gas from the gas feed, and when the HTL mixed with incoming gas reaches the broadening cross section, pressure is increased.

According to an aspect of some embodiments of the present disclosure there is provided a method of energy storage and retrieval including using a first air compressor operating with Heat Transfer Liquid (HTL-compressor) to compress air into an air chamber, storing the air as compressed air in the air chamber, using the compressed air from the air chamber to feed into a second turbine operating with Heat Transfer Liquid (HTL-turbine) and produce work.

According to some embodiments of the disclosure, the HTL in the HTL-compressor is water.

According to some embodiments of the disclosure, the HTL in the HTL-turbine is water.

According to some embodiments of the disclosure, using the HTL-compressor includes causing HTL to flow along a chamber in the HTL-compressor to a gradually narrowing cross section of the chamber, wherein flow of the HTL is accelerated and pressure of the HTL is lowered due to a Venturi effect, thereby causing the HTL-compressor to suck air into the HTL-compressor.

According to some embodiments of the disclosure, the HTL-compressor is configured to lower pressure of the HTL to below ambient pressure.

According to an aspect of some embodiments of the present disclosure there is provided a method for continuous gas compression including maintaining a flow of Heat Transfer Liquid (HTL) at a pressure higher than ambient pressure along a circular flow path around a closed-loop-shaped flow chamber, including causing the HTL to flow through a narrow cross-section Venturi profile of the flow chamber, causing a reduction of pressure of the flowing HTL below ambient pressure within the Venturi profile, providing gas to be sucked into the Venturi profile of the flow chamber to mix with the HTL, bleeding off pressurized gas through a pressure valve at a non-Venturi section of the flow chamber.

According to some embodiments of the disclosure, including controlling a proportion of the gas to the HTL so that the HTL maintains an approximately constant temperature.

According to some embodiments of the disclosure, gas is provided to the Venturi profile at a temperature higher than a temperature of the HTL.

According to an aspect of some embodiments of the present disclosure there is provided a method for converting waste heat of exhaust gas to work while also reducing $CO_2$ from the exhaust gas, including providing a heat transfer liquid (HTL) including molten salt and $CO_2$-capturing material, directing exhaust gas including $CO_2$ into and the HTL through a direct contact heat exchanger thereby heating the HTL by heat from the exhaust gas, and enabling the $CO_2$-capturing material to capture $CO_2$ from the exhaust gas, thereby reducing an amount of $CO_2$ in the exhaust gas, operating an HTL-turbine using the heated HTL, and producing work using a turbine operating with the HTL (HTL-turbine).

According to some embodiments of the disclosure, the $CO_2$-capturing material includes a material selected from a group consisting of CaO, MgO, $NaCO_3$ $(+H_2O)$, $NaCO_3$, $KCO_3$ $(+H_2O)$, $KCO_3$, and $Na_2O$.

According to an aspect of some embodiments of the present disclosure there is provided a method for converting waste heat of exhaust gas to work, including heating a heat transfer liquid (HTL) including molten salt using a heat exchanger and waste heat of exhaust gas, operating an HTL-turbine using the HTL, and producing work using the HTL-turbine.

According to some embodiments of the disclosure, the heat exchanger is a direct contact heat exchanger.

According to some embodiments of the disclosure, producing work includes producing electricity.

According to some embodiments of the disclosure, the HTL includes $CO_2$ capturing material, to absorb $CO_2$ from the exhaust gas.

According to some embodiments of the disclosure, $CO_2$ capturing material which has absorbed $CO_2$ from the exhaust gas is removed before reaching the HTL-turbine.

According to an aspect of some embodiments of the present disclosure there is provided a HTL-compressor including a closed chamber including a Heat Transfer Liquid (HTL) feed, sucking HTL from the chamber and feeding the HTL into a plurality of rotating arms, each arm including a passage enabling flow of the HTL, the passage including a Venturi narrowing wherein pressure of flowing HTL is reduced below ambient pressure, a gas feed, enabling gas entrance at ambient pressure into the chamber, and providing gas into the rotating arms, a nozzle attached to a distal portion of each arm, the nozzles including a passage accepting input of a mixture of HTL and gas and providing exit to the mixture at an end of the nozzle, wherein the HTL-compressor is configured so that the mixture exits the nozzle at a pressure higher than the ambient pressure.

According to some embodiments of the disclosure, the HTL-compressor is configured so that a gas-and-HTL mix exiting the nozzle exits with a kinetic energy no more than 25% of energy input into the HTL-compressor.

According to some embodiments of the disclosure, the HTL-compressor is configured so that the mixture exits the nozzle at approximately zero speed relative to the chamber.

According to some embodiments of the disclosure, the chamber enables HTL exiting the nozzle to drop directly onto a bottom of the chamber.

According to some embodiments of the disclosure, the HTL feed includes a gradually narrowing cross section which provides a Venturi effect for the HTL flowing from the chamber and provided to the rotating arms.

According to an aspect of some embodiments of the present disclosure there is provided a method of compressing gas including, in a chamber for compressing gas, rotating a plurality of rotating arms, each arm including a passage enabling flow of Heat Transfer Liquid (HTL), thereby propelling HTL within the arms toward radial ends of the arms, providing gas to mix with the HTL in the arms, thereby producing a gas-and-HTL mix, enabling the gas to mix with the HTL so that centrifugal forces acting upon the gas-and-HTL mix compress the gas, thereby raising pressure of the gas-and-HTL mix, enabling the gas-and-HTL mix to exit the arm through a nozzle positioned so that momentum of exiting gas-and-HTL rotates the arm, causing the mixture to exit the nozzle at a higher than ambient pressure, and sucking the HTL up through a pipe toward the rotating arms, wherein the pipe through which the HTL is sucked up toward the rotating arms has a gradually narrowing cross section which provides a Venturi effect for the HTL flowing from the chamber to the rotating arms.

According to some embodiments of the disclosure, providing the gas includes controlling the providing so that a gas-and-HTL mix exiting the nozzle exits at approximately zero speed relative to a body of the HTL-compressor.

According to some embodiments of the disclosure, providing the gas includes controlling the providing so that a gas-and-HTL mix exiting the nozzle exits with a kinetic energy no more than 25% of energy input into the HTL-compressor.

According to some embodiments of the disclosure, the HTL is colder than the incoming gas.

According to some embodiments of the disclosure, the HTL includes water.

According to an aspect of some embodiments of the present disclosure there is provided a HTL-compressor including a closed-loop-shaped flow chamber including a Heat Transfer Liquid (HTL) pump, pumping HTL in a first direction along the chamber, a gradually narrowing cross section which provides a Venturi effect for the HTL flowing along the chamber, a gas feed, enabling gas entrance into the gradually narrowing cross section, a broadening cross section following the narrowing cross section, and a gas exit, for bleeding off pressurized gas, wherein, when HTL flows along the chamber, when the HTL reaches the gradually narrowing cross section, flow of the HTL is accelerated and pressure of the HTL is lowered due to the Venturi effect, thereby sucking gas from the gas feed, and when the HTL, mixed with incoming gas, reaches the broadening cross section, pressure is increased.

According to some embodiments of the disclosure, when the HTL reaches the gradually narrowing cross section, pressure of the HTL is lowered to below ambient pressure.

According to some embodiments of the disclosure, the gas feed is located at a center of a cross section of the gradually narrowing cross section.

According to some embodiments of the disclosure, a cross-section area of the gas feed is between 10% and 50% of a cross-section area of a narrowest part of the gradually narrowing cross section.

According to an aspect of some embodiments of the present disclosure there is provided a method of compressing gas including, in a closed-loop-shaped flow chamber, pumping Heat Transfer Liquid (HTL) at a first temperature in a first direction along the chamber, into a Venturi section of the chamber, providing gas from outside the chamber to the Venturi section at a second temperature, the second temperature being higher than the first temperature, enabling the gas and the HTL to mix and equalize temperature of the gas and the HTL, thereby producing a gas-and-HTL mix, compressing the gas-and-HTL mix from the Venturi section into a second section with a wider cross section, and bleeding off gas out of the chamber, wherein the Venturi section has a narrowing cross section, which provides a Venturi effect for the HTL flowing along the Venturi section, lowering pressure of the HTL to below a pressure outside the chamber.

According to some embodiments of the disclosure, the HTL includes water.

According to an aspect of some embodiments of the present disclosure there is provided a nozzle for an HTL-turbine including a mixing chamber, a heating chamber, and an outlet section, wherein the mixing chamber includes an inlet for High Temperature Liquid (HTL) and an inlet for gas, the chamber includes a gradually expanding cross-sectional area, the outlet section includes a gradually narrowing cross-sectional area.

According to some embodiments of the disclosure, the outlet section is configured in a de Laval converging diverging geometry, to accelerate a mix of gas and HTL to a speed of at least one Mach at the end of a converging section.

According to some embodiments of the disclosure, including providing a nozzle as described herein, providing Heat Transfer Liquid (HTL) into the mixing chamber at a temperature of $T_{HTL}$, injecting gas into the mixing chamber at a temperature of $T_{gas}$ and a pressure of $P_{gas} < P_{st} * T_{Gas}/T_{HTL}$, and maintaining pressure $P_{mixing}$ in the mixing chamber to be lower than $T_{HTL}/T_{Gas} * P_{st}$ where Pst is a stagnation pressure at an entrance of the nozzle.

47. A method of operating an HTL-turbine including providing a nozzle as described herein, providing Heat Transfer Liquid (HTL) into the mixing chamber at a temperature of $T_{HTL}$, injecting gas into the mixing chamber at a temperature of $T_{Gas}$ and a pressure of $P_{Gas}$, and maintaining pressure of gas entering the mixing chamber at a pressure $P_{Gas}$ lower than $T_{Gas}/T_{HTL} * P_{st}$.

According to an aspect of some embodiments of the present disclosure there is provided a Heat Transfer Liquid (HTL) including $CO_2$-capturing material selected from a group consisting of CaO, MgO, $NaCO_3$ ($+H_2O$), $NaCO_3$, $KCO_3$ ($+H_2O$), $KCO_3$, and $Na_2O$.

According to an aspect of some embodiments of the present disclosure there is provided a method of producing a Heat Transfer Liquid (HTL) including mixing a $CO_2$-capturing material with another HTL material, the $CO_2$-capturing material selected from a group consisting of CaO, MgO, $NaCO_3$ ($+H_2O$), $NaCO_3$, $KCO_3$ ($+H_2O$), $KCO_3$, and $Na_2O$.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 1C is a simplified block chart illustration of an HTL-turbine according to an example embodiment;

FIG. 1D is a simplified block chart illustration of an HTL-turbine according to an example embodiment;

FIG. 3C is a simplified flow chart illustration of a method for continuous isothermal gas compression according to an example embodiment;

DESCRIPTION OF SPECIFIC EMBODIMENTS

Figure 1B:
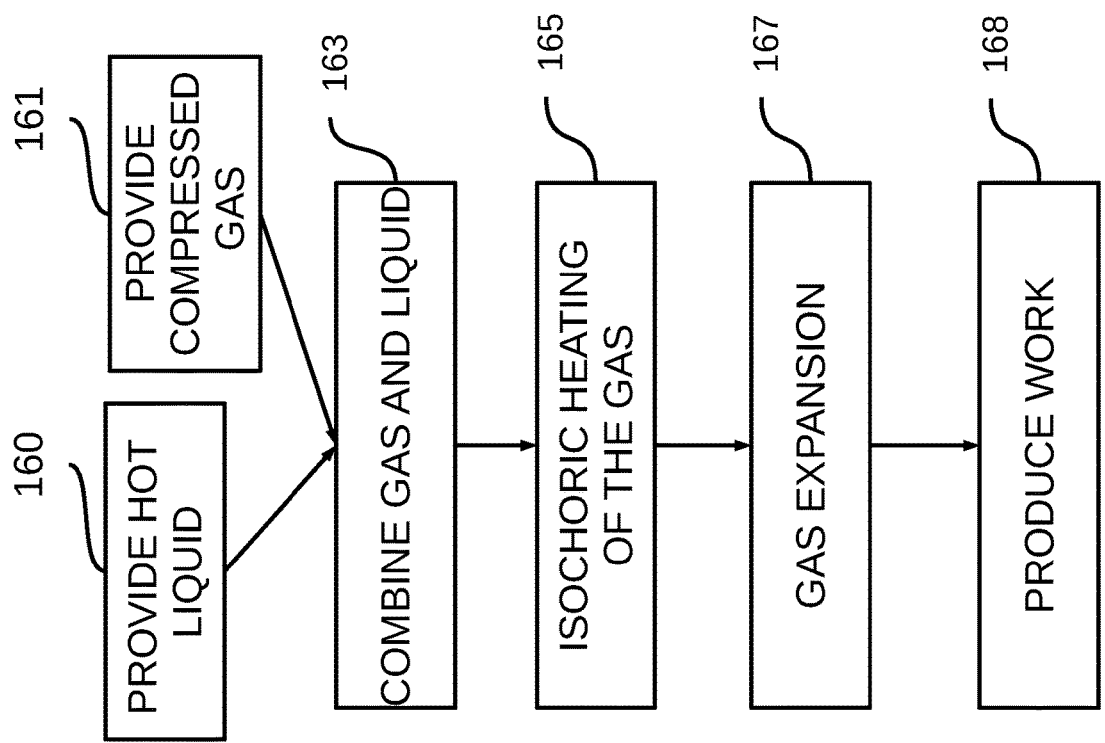
FIG. 1B is a simplified flow chart illustration of a method according to an example embodiment.

The present disclosure, in some embodiments thereof, relates to a method and to devices for mixing gas and liquid and producing work and/or compressing the gas.

Overview

The present disclosure describes methods and systems at a system level, and also describes some devices which optionally participate in the broader methods and systems.

The term "HTL-compressor", is used throughout the present specification and claims to mean a gas compressor operating with Heat Transfer Liquid.

The term "HTL-turbine", is used throughout the present specification and claims to mean a heat-engine operating with Heat Transfer Liquid.

An aspect of some embodiments relates to using energy and a liquid to isothermally compress air.

In some embodiments, the energy is provided in a form of rotation, and the rotation is used to rotate one, two, or more arms, each of which includes a pipe from a central hub, also a pipe, to one or more nozzles aimed so as to emit an HTL and air mixture at a low speed, preferably approximately zero speed, relative to a body of the compressor, demonstrating that all or most of the energy provided has been converted to work.

In some embodiments, the HTL and air mixture is emitted at a low speed, with a kinetic energy of no more than 5%, 10%, 15%, 20% or 25% of energy input into the HTL-compressor.

Emitting the mixture is optionally performed through a nozzle which accelerates the mixture.

Accelerating the mixture produces lower pressure of the mixture, which also causes sucking up HTL into the arms, and sucking in air through one or more air pipes leading to the hub or to the arms.

Such an HTL-compressor can suck in air, by virtue of low pressure produced by HTL flowing up from a liquid reservoir along the rotating arms and ejected back into the HTL reservoir. Such an HTL-compressor can continuously compress air as long as the arms are rotated. The HTL is not transferred from one chamber into another, rather circulates from a HTL chamber, through the arms, and back into the HTL chamber.

HTL is optionally used for its high thermal capacity relative to gas, maintaining the gas at approximately the same temperature as the HTL, at the same time as compressing the gas, potentially inducing isothermal or quasi isothermal compression.

In some embodiments, temperature of the gas equalizes to temperature of the HTL, and HTL subsequently maintains the gas at approximately the same temperature at the HTL along with optional compression, in a process of isothermal compression.

An aspect of some embodiments includes using HTL and a source of energy to compress air in a closed-loop-shaped chamber.

A pump causes HTL to flow in a closed loop. The closed loop includes one or more narrowing(s) or constriction(s). HTL flowing through a constriction flows faster, and by virtue of an effect called the Venturi effect, causes a reduction in HTL pressure. One or more air pipes are introduced to the HTL chamber at the constrictions, and the reduced pressure sucks in air. Now there is added air also flowing through the liquid chamber. When the HTL exits the constriction the HTL returns to a higher pressure, which compresses the air. The higher-pressure air can be bled out of the HTL chamber.

Such a design potentially provides an advantage of having less moving parts than the design described above, potentially fewer total parts, potentially simpler design, and potentially takes up less volume. This design uses the Venturi effect for producing suction and subsequent compression, rather than rotation of arms, Rotation of arms may benefit from a large radius of rotation, the Venturi effect does not require space for the rotating arms to rotate. Mixing the gas with the liquid along with compression results in isothermal or quasi isothermal compression.

The HTL continues to flow in the closed-loop-shaped chamber, sucking in air at an initial pressure, by way of a non-limiting example at ambient pressure, and bleeding off the air at a higher pressure.

In some embodiments, the air may optionally be bled off a section of the chamber where the air is separated from the HTL by gravity, the HTL being in a lower position in the chamber than the air.

In some embodiments, the air may optionally be bled off a section of the chamber where the air is separated from the HTL by centrifugal force, for example by causing the air-and-HTL to swirl and separate to air and HTL.

Such an HTL-compressor can continuously compress air as long as the HTL pump(s) are rotated. The HTL is not transferred from one chamber into another, rather circulates in the closed-loop-shaped HTL chamber.

In some embodiments, the HTL may be cooler than the air. When the air joins the HTL, the air cools down. It is noted that it may be beneficial to cool air before or during compression, since compressed air which subsequently cools may lose some of its pressure.

In some embodiments, the HTL may be hotter than the air. When the air joins the HTL, the air warms up.

In some embodiments the HTL may be water.

An aspect of some embodiments includes using compressed air from a pressurized air chamber, mixing the air with HTL, and ejecting the air/HTL mixture through nozzles, to rotate an air-and-HTL-operated HTL-turbine.

Such embodiments provide a way to use compressed air which is compressed during a period of energy being more available, to retrieve when energy is less available, thereby flattening the curve of energy availability. Such embodiments provide a way to use compressed air which is compressed during a period of energy being less expensive, to retrieve when energy is more expensive, thereby potentially providing a saving in energy expenses. Also the mixing of gas and liquid induces isothermal compression that is more energy efficient then non-isothermal compression.

In some embodiments, the HTL-turbine produces work. In some embodiments, the work produces electricity. In some embodiments, the work compresses air.

An aspect of some embodiments includes combining use of a gas-and-liquid HTL-compressor to compress air, and use of an HTL-turbine to produce work.

In some embodiments, the HTL-turbine run by HTL and compressed air may be used to produce electricity.

In some embodiments, the HTL is warmer or even much warmer than the compressed air, heating the air and producing additional work or energy than would be produced if the HTL was not warmer than the compressed air.

In some embodiments, the HTL-turbine includes a static nozzle, optionally a nozzle as described herein, and a rotating Pelton turbine, producing work.

In some embodiments, when energy is available, as mechanical energy to operate a HTL-compressor, or as heat for heating HTL which optionally drives a HTL-turbine connected to the HTL-compressor, the energy is optionally stored as compression of air in a compressed air chamber.

In some embodiments, a HTL-turbine is used to produce energy, by way of a non-limiting example as electricity, optionally using compressed air from a compressed air chamber. The production of energy can be at a rate corresponding to a desired energy consumption.

The above paragraphs describe a system of continuously compressing air into a chamber when energy is available for the compressing, thereby storing energy, coupled to continuously producing energy from the compressed air, at a rate determined by consumer needs. The rate of storing energy is decoupled from the rate of consuming energy, and the two rates do not necessarily depend on each other.

In some embodiments, energy may be stored slowly, over time, and released quickly, when needed.

In some embodiments, energy may be stored quickly, just because it is available, for example solar energy when the sun is high in the sky, and released slowly, when needed, for example over the rest of the day and night.

An aspect of some embodiments includes specific nozzle geometries, which potentially improve performance of an HTL-turbine and/or an HTL-compressor.

An aspect of some embodiments includes controlling a rate of arrival of air into the specific nozzle geometries, which potentially improves performance of the HTL-turbine and/or the HTL-compressor, and/or prevents malfunctions. For example, controlling the rotation of the HTL-turbine at a varying load may be done by controlling the rate of arrival of air.

In some embodiments the nozzle is designed to include a mixing chamber where air enters the nozzle and mixes with HTL at a pressure close to the stagnation pressure, optionally more than 50% of the stagnation pressure, where stagnation pressure is defined as a static pressure of HTL at zero velocity.

In some embodiments a valve is electronically or mechanically controlled so that air enters the nozzle and mixes with HTL at a pressure close to the stagnation pressure, optionally more than 50% of the stagnation pressure.

Staying away from stagnation pressure potentially prevents backward flow, which may disrupt the suction caused by the flowing HTL, and may cause discontinuity in the HTL, that is, formation of very large bubbles which do not reach temperature equilibrium with the HTL.

In some embodiments, in an isochoric heating or quasi isochoric heating section in the nozzle, air is injected into the HTL at a pressure close to stagnation pressure, at the entrance of the HTL to the nozzle, modified by dividing by a ratio of the HTL and air temperatures, $P_{gas} < P_{stagnation} * T_{gas}/T_{HTL}$. In some embodiments, the injection pressure is optionally more than 50% of the modified value.

An aspect of some embodiments includes mixing exhaust gasses with HTL, in an HTL-turbine.

Exhaust gasses are sometimes hot—for example conventional exhaust temperature may be greater than 90 C, potentially greater then 300 C, potentially greater then 600 C—providing heat to drive the HTL-turbines described herein.

In some embodiments, exhaust gasses are gathered and with their pressure, speed, or momentum, may potentially provide extra energy to the HTL-turbines described herein.

Exhaust gasses may contain $CO_2$, in some cases even a high concentration of $CO_2$.

In some embodiments, the HTL is selected so as to include a material which absorbs $CO_2$, thereby reducing greenhouse emissions.

In some embodiments, the material which absorbs $CO_2$ is selected so as to interact with the $CO_2$ and produce a new material which can be removed from the HTL, thereby removing $CO_2$ from the HTL and collecting the $CO_2$ for disposal elsewhere.

In some embodiments, a supply of the new material is optionally added to the HTL, to compensate for the material-plus-$CO_2$ which is removed from the HTL.

In some embodiments, the material which absorbs $CO_2$ may optionally change properties of the HTL. By way of a non-limiting example, the material which absorbs $CO_2$ may have a high melting temperature and may, when mixed with other salts, produce an HTL capable of being molten at a lower temperature, thereby potentially enabling operating at lower temperature. In some embodiments, even when the material which absorbs $CO_2$ is added as a small percentage of the total HTL, the material may change the melting temperature of the total. By way of a non-limiting example, mixing 90% solar salt (for example—60% NaNo3, and 40% KO3) in addition to 10% CaO, can potentially absorb $CO_2$ from exhaust gasses, while maintaining a melting temperature of less than 300 C, which is potentially useful as HTL in an HTL-turbine.

An aspect of some embodiments relates to producing HTL which includes $CO_2$ absorbing material.

In some embodiments, the $CO_2$ absorbing material is mixed with a not-necessarily $CO_2$ absorbing material in order to change its melting temperature, thereby potentially enabling use of a mixture which is liquid at a temperature which one or more of its constituents are not typically liquid. For example, MgO is known to absorb $CO_2$, but has a very high melting temperature. Mixing 95% solar salt (60% NaNO3, 40% KNo3), with 5% MgO, potentially reduce melting temperature to below 300 C where the HTL turbine can be made from less costly materials, and operate at relevant temperatures for exhaust gases.

An aspect of some embodiments includes using exhaust gasses from a turbine or engine as a heat source and/or as a low-oxygen gas source.

In some embodiments, a heat exchanger transfers heat between exhaust gas and, by way of a non-limiting example, molten salt as HTL.

Such a HTL-turbine operating on exhaust gasses potentially increases energy generated by an energy generating system, which optionally collects the exhaust gasses from an energy generator uses them to generate additional work. Potentially, using the exhaust gasses may also reduce $CO_2$ emissions of the turbine or engine heat source.

In some embodiments, the HTL may be chosen to include known $CO_2$ capture materials to absorb the $CO_2$ from the exhaust gas, thereby reducing the $CO_2$ emission, which is desirable for the environment.

In some embodiments, salts such as CaO, MgO, $NaCO_3$ $(+H_2O)$, $KCO_3$ $(+H_2O)$, or $Na_2O$ are optionally be added to molten salt HTL, to absorb $CO_2$.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 1A:
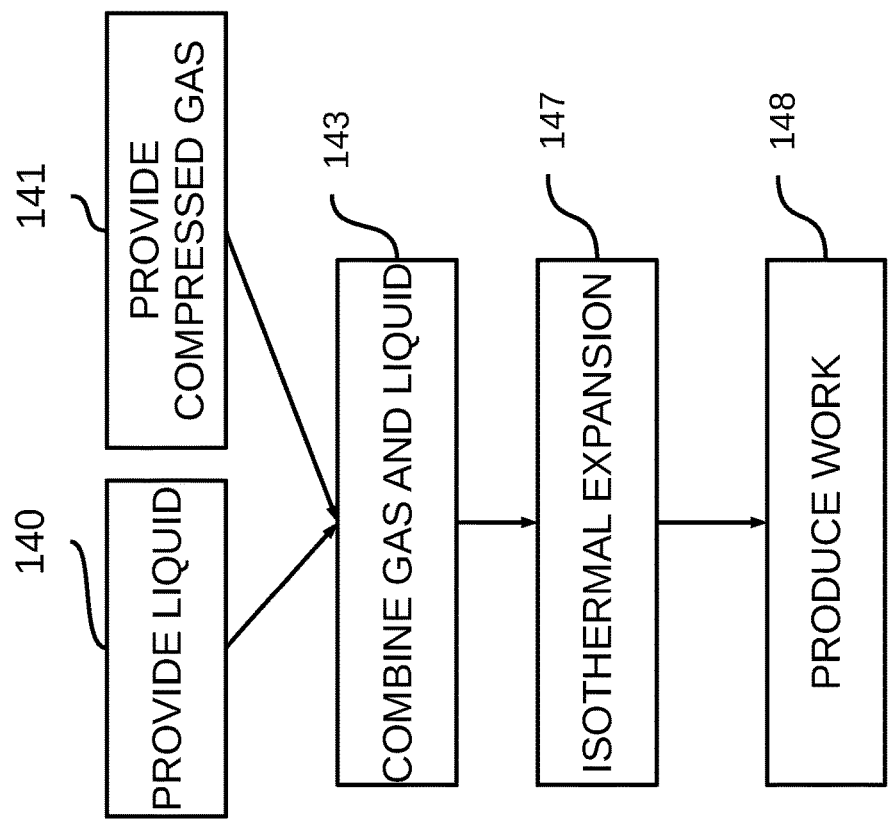
FIG. 1A is a simplified flow chart illustration of a method according to an example embodiment.

Reference is now made to FIG. 1A, which is a simplified flow chart illustration of a method according to an example embodiment.

FIG. 1A is meant to show a heat process which potentially extract more work from a compressed gas than would be extracted if the gas expansion was not isothermal.

The method shown by FIG. 1A includes:
providing liquid (140);
providing compressed gas (141);
combining the gas and the liquid (143);
enabling the gas and the liquid to perform isothermal expansion (147),
thereby producing work (148).

In some embodiments, the method includes performing isochoric heating of the gas before the isothermal expansion (147).

Reference is now made to FIG. 1B, which is a simplified flow chart illustration of a method according to an example embodiment.

FIG. 1B is meant to show a heat process which potentially extracts more work from a compressed gas than would be extracted if the gas heating was not isochoric.

FIG. 1B also shows an optional stage of isothermal expansion which potentially extract more work from a compressed gas than would be extracted if the expansion was not isothermal.

The method shown by FIG. 1B includes:
providing hot liquid (160);
providing compressed gas (161);
combining the gas and the liquid (163);
performing isochoric heating of the gas (165);
enabling the gas to perform expansion (167),
thereby producing work (168).

In some embodiments, enabling the gas to perform expansion (167) comprises enabling the gas to perform isothermal expansion.

Reference is now made to FIG. 1C, which is a simplified block chart illustration of an HTL-turbine according to an example embodiment.

FIG. 1C is meant to show a generic HTL-turbine, where pressurized gas and liquid are combined, and work is produced.

In the HTL-turbine of FIG. 1C, pressurized gas 150 and liquid 151 are combined in a combiner 152.

The pressurized gas expands, in what is isothermal expansion 153, or close to isothermal expansion, and also accelerates the liquid.

Because the thermal capacity of the liquid per volume is much greater than that of the gas, the temperature of the gas-and-liquid combination does not change as much as if only the gas were to expand, without presence of the liquid.

The work produced potentially benefits from the mass of the accelerated liquid, which is typically greater than the mass of the gas.

Reference is now made to FIG. 1D, which is a simplified block chart illustration of an HTL-turbine according to an example embodiment.

FIG. 1D is meant to show a generic HTL-turbine, where gas and heated liquid are combined, and work is produced.

In the HTL-turbine of FIG. 1D, gas 155 and heated liquid 156 are combined in a combiner 157.

The gas heats up by heat transfer from the liquid, in a volume 158 which does not allow the gas to expand. The heating is isochoric heating, or close to isochoric heating.

An isochoric process, also called a constant-volume process, an isovolumetric process, or an isometric process, is a thermodynamic process during which volume of a closed system undergoing such a process remains constant.

In some embodiments, because the thermal capacity of the liquid is much greater than that of the gas, the temperature of the gas-and-liquid combination may not change much.

Following the isochoric heating, the pressurized gas is allowed to expand, in what is close to isothermal expansion 159, or close to isothermal expansion, and also accelerates the liquid.

The work produced potentially benefits from the mass of the accelerated liquid, which is typically greater than the mass of the gas.

Isothermal compression, or close to isothermal compression, and isothermal expansion, or close to isothermal expansion, can be achieved. 100% isothermal work capacity is: $PVlan(P/P_0)$ Joule. By mixing liquid with gas when compressing or expanding the gas, we add thermal mass of liquid to the gas, and cam potentially achieve 50% and up to close to 100% of isothermal compression and expansion.

Gas such as air is optionally compressed at a temperature of 50 degrees Celsius and optionally even lower, 100 C and lower, 350 C and lower.

In some embodiments, it is preferable to compress the gas at cold temperature such as 20 C or 1 C, for example when the HTL is water, and even below 0 C when the HTL is an anti-freeze liquid.

Isochoric heating of the gas to the temperature of the HTL can heat the gas up to temperatures of 500 C or 750 C and higher up to 1500 C. Substantially isothermal compression and expansion of gas is performed by a mixing between liquid and gas in during the isothermal process. The high heat capacity of the liquid maintains an approximately constant temperature of the gas. For example, injecting air as bubbles into water or spraying air with water are two efficient ways to increase surface area between the air and water to enable isothermal expansion and compression of the air. The liquid can be a heat transfer liquid, optionally at a high temperature. By way of some non-limiting examples, thermal oil at 600K or molten salt at 830K or higher.

Various examples are described herein of an HTL-turbine that benefits from the properties of isothermal processes.

Aspects of some examples relate to storage and conversion of solar energy, and conversion of waste heat to electricity.

Aspects of some examples relate to using a high temperature incompressible liquid (for example molten salt, or thermal oil) mixed with gas for isothermal expansion of the gas at a high temperature for producing work.

An aspect of some embodiments relates to operating an air-and-liquid HTL-turbine and an air-and-liquid HTL-compressor at a similar temperature, optionally with water as HTL for a hydroelectric energy storage and recovery system.

An aspect of some embodiments relates to producing electricity. Hydroelectric turbines where pressurized water drives an electric generator, have a typical efficiency of 90% and are some of the most efficient and cost-effective energy converters.

Hydroelectric energy storage, where water is pumped to an elevated altitude and then used for generating electricity has around 70%-80% electricity to electricity efficiency and is considered an efficient energy storage method.

Figure 2A:
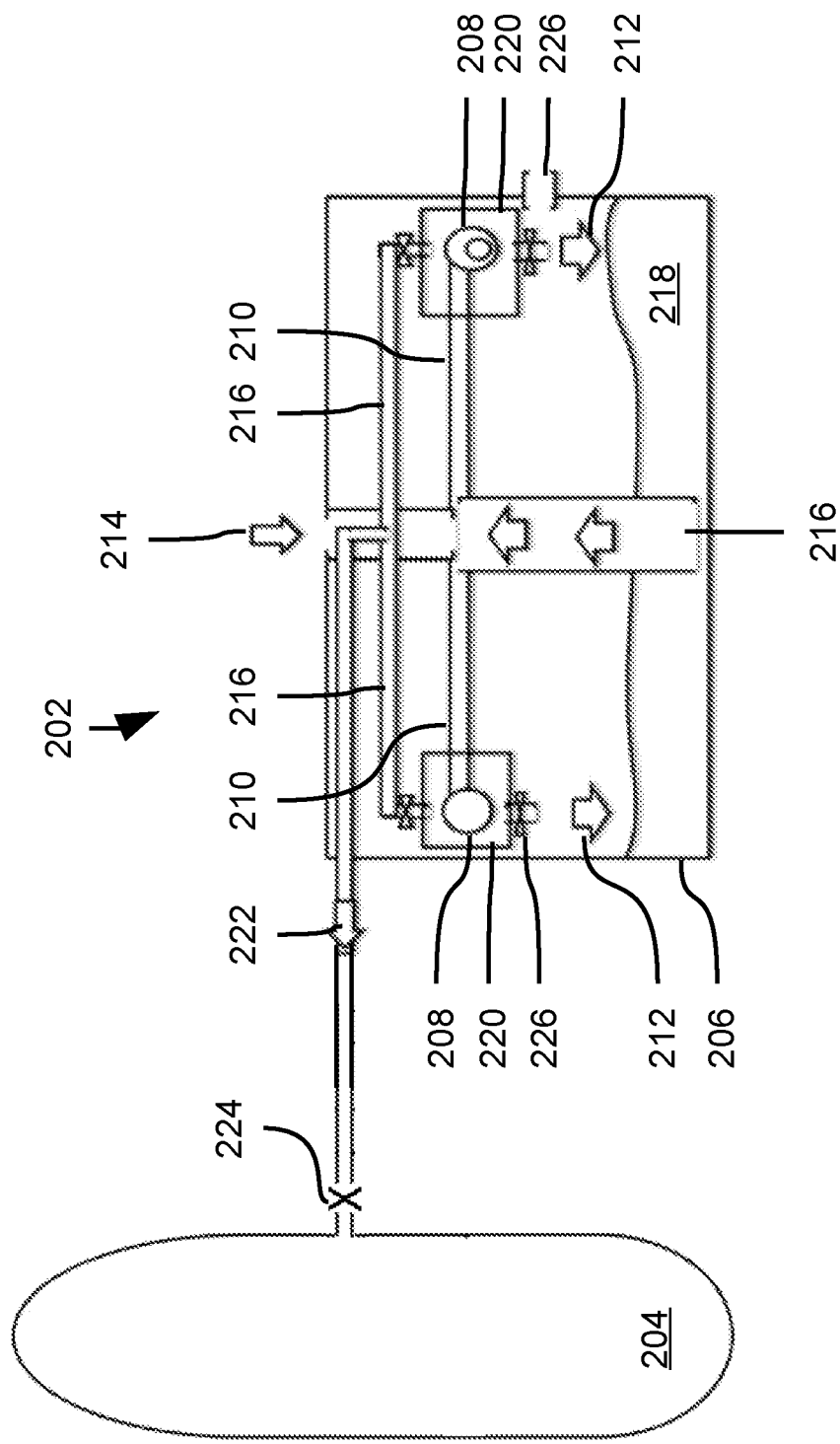
FIG. 2A is a simplified illustration of a device for continuous isothermal gas compression according to an example embodiment.

Reference is now made to FIG. 2A, which is a simplified illustration of a device for continuous isothermal gas compression according to an example embodiment.

FIG. 2A shows a HTL-compressor 202 which includes a tank or container 206, in which one or more engines or nozzles 208 are mounted on arms 210. The arms 210 are designed to rotate.

When the arms 210 and nozzles 208 rotate, optionally rotated by a mechanical shaft or an electric motor (not shown), centrifugal force acts upon HTL in the arms, forcing the HTL toward the nozzles 208 and out 212 of the nozzles 208. The movement of the HTL causes suction 214 216, sucking HTL 218 from the container 206. As the arms rotate, the HTL 218 is sucked or pumped into the arms 210, and air is also sucked 214 into the arms 210. The air is compressed, raising pressure in pressure chambers 220 mounted at exits of the nozzles 208.

The compressed air in the pressure chambers 220 may be used, for example, by drawing through a pipe 216 leading from the pressure chamber 220 and providing 222 compressed gas or air at an exit of the device 202, which may or may not include a pressure valve 224, and optionally compresses the air into a compressed air tank or container 204.

In some embodiments, a valve 226 enables liquid accumulating in the pressure chamber 220 to flow back into the container 206, so as not to accumulate in the pressure chamber 220.

In some embodiments, the container 206 is at ambient pressure. FIG. 2A shows an optional opening 226 which enables the container 206 to equalize pressure with outside the container 206.

Figure 2B:
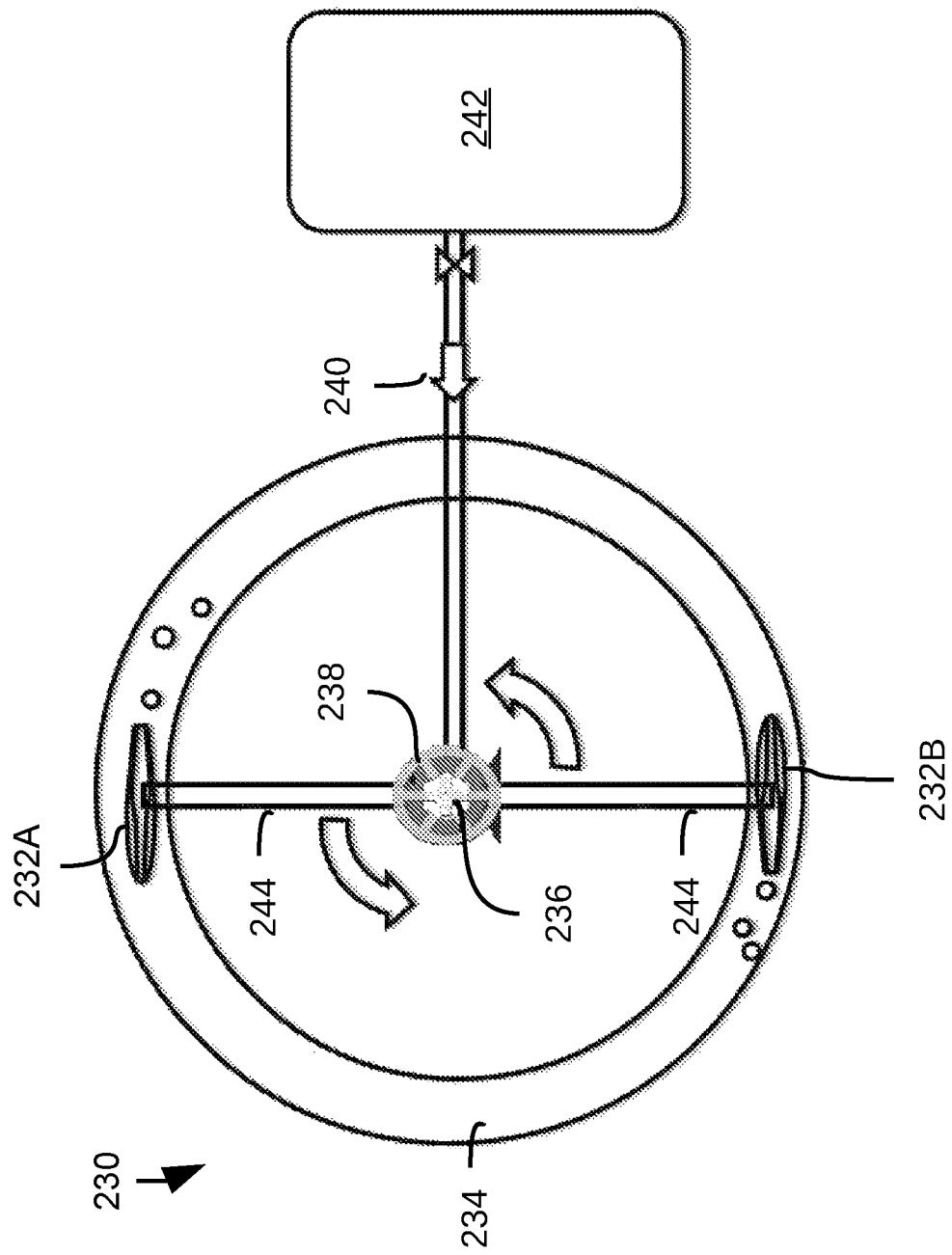
FIG. 2B is a simplified illustration of an HTL-turbine with nozzles according to an example embodiment.
Figure 3A:
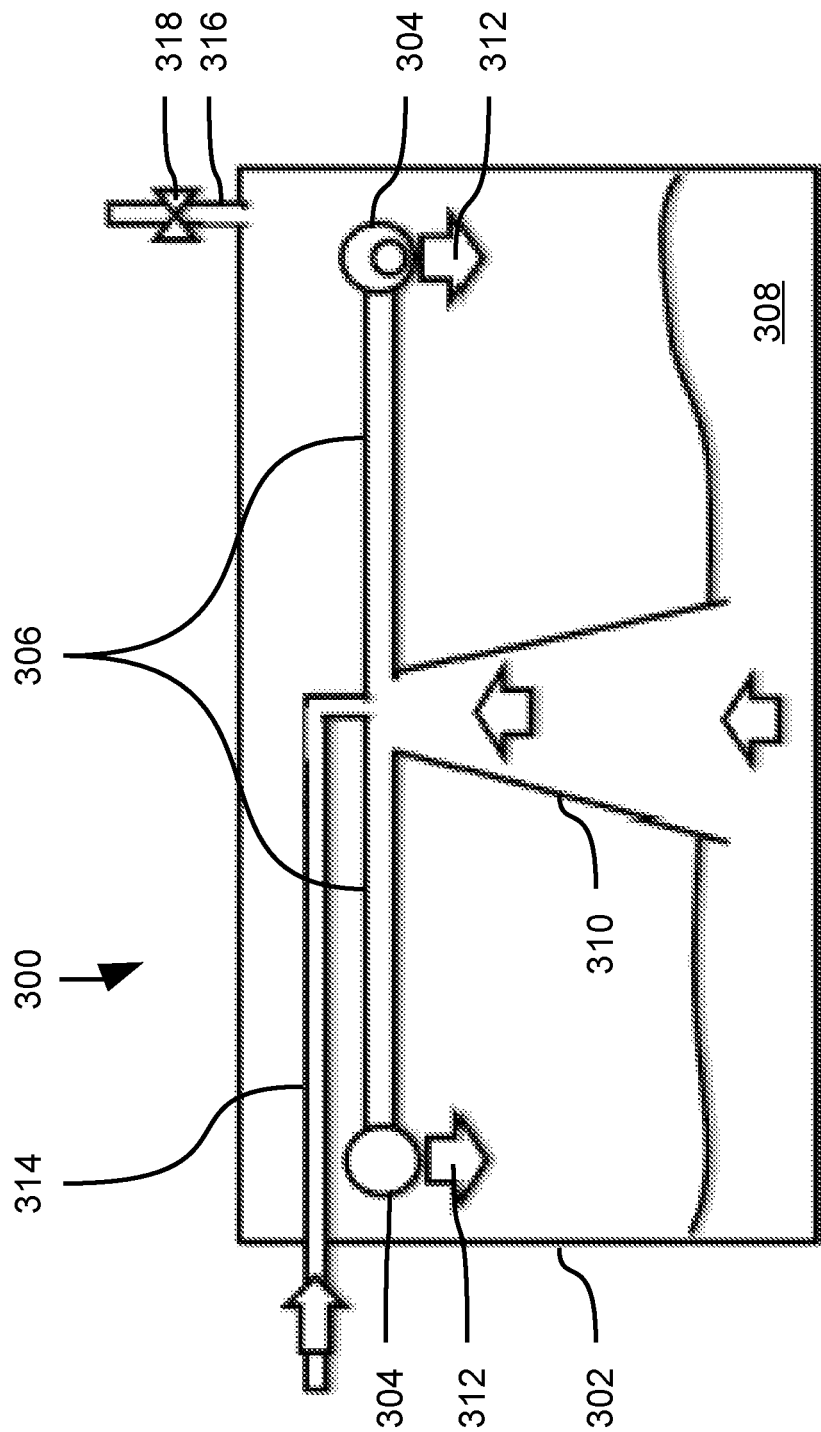
FIG. 3A is a simplified illustration of an HTL-compressor for continuous isothermal gas compression according to an example embodiment.

In some embodiments, an HTL-compressor as shown in FIG. 3A can be used instead of the HTL-compressor as shown in FIG. 2A. In some embodiments, the HTL-compressor shown in FIG. 3A may be more efficient than the HTL-compressor shown in FIG. 2A Reference is now made to FIG. 2B, which is a simplified illustration of an HTL-turbine with nozzles according to an example embodiment.

FIG. 2B shows a HTL-turbine 230 with two jet nozzles 232A 232B rotating in or above an HTL pool 234. A potential advantage of such a configuration is an ability to generate power continuously.

In various embodiments, one, two, or more nozzles can optionally rotate in or above the HTL pool 234, producing a rotation torque transferred to a shaft 236 connected to an electric generator unit 238 or a pump 238.

In some embodiments, air is supplied 240 from a compressed air source 242, through a central axis and through arms 244 reaching the nozzles 232A 232B.

In some embodiments, the air expands isothermally in the nozzle(s) 232A 232B, rotating the shaft 236, producing work as electricity and/or mechanical work.

In some embodiments, the HTL-compressor 230 is configured to enable a gas-and-HTL mix to exit the nozzles 232A 232B at approximately zero kinetic energy relative to a body of the HTL-compressor 230, or at least a kinetic energy significantly lower than the energy input into the HTL-compressor 230, for example lower than 25% of the energy input into the HTL-compressor 230.

By way of a non-limiting example, FIG. 2B shows a top view of two nozzles 232A 232B rotating a main shaft 236 connected to an electric generator 238 or a pump 238 or a hydro pump 238.

In various embodiments, any number of nozzles 232 can be connected to generate more power.

It is noted that the number of arms 244 and nozzles 232A 232B is not limited to two. Any integer number of arms and nozzles is to be understood, and two arms 244 and two nozzles 232A 232B are only a non-limiting example.

In some embodiments, HTL-turbines as described in FIG. 2B is optionally used continuously, being fed with compressed air from sources and/or chambers. This is in contrast with systems which charge a chamber with compressed air, and when the pressure in the chamber is used up, stop to recharge the chamber.

In some embodiments, the HTL temperature may be reduced at each flow cycle through the nozzle. After a few cycles, the HTL temperature in the HTL-turbine may be reduced below a specific temperature, and the HTL may be replaced with hotter HTL. By way of a non-limiting example, molten salt temperature in the HTL-turbine should not be reduced below the melting temperature of the salt. Therefore, once the molten salt temperature reaches 100 C, 50 C, 30 C, 10 C or 1 C above the melting temperature of the salt, the HTL is optionally drained into a cold HTL reservoir (not shown), and hot molten salt may be added into the HTL-turbine from a hot-HTL reservoir. In some embodiments, draining cold molten salt and input of hot molten salt are done in parallel, in order to keep the HTL-turbine operating continuously.

Some non-limiting example operating parameters for the configuration shown in FIG. 2B include:

Example 1: The HTL may be at a high temperature, for example 670K, or in a range from 80 C to 1500 C, and pressurized air may be provided at a pressure of 5 Bar or higher, for example 14 Bar, 20 Bar, 40 Bar or 120 Bar, and a high temperature of 670K, or in a range from 80 C to 1500 C.

Example 2: The HTL may be at a high temperature, for example 670K, and pressurized air may be provided at a pressure of 5 Bar and at an ambient temperature, by way of a non-limiting example 20 C. In some embodiments, the air heats when mixed with the heated HTL.

Example 3: This example can optionally be used for energy storage. The HTL may be at ambient temperature, for example 21 C, and pressurized air may be provided at a pressure of 40 Bar and at the ambient temperature. In some embodiments, the pressurized air may be provided from a source of pressurized air. In some embodiments, the source of pressurized air is used to store energy in a form of pressurized air, and the configuration of FIG. 2B is used to produce energy, for example in form of electricity.

The configuration of FIG. 2B may provide one or more of the following benefits:

In some embodiments, there is no need to use an HTL pump to continuously provide HTL to the nozzles 232A 232B. When the nozzles are in operation, centrifugal force conveys HTL along the arms 244 to the nozzles 232A 232B, and suction from the HTL being conveyed to the nozzles sucks HTL from the HTL pool 234.

In some embodiments, operation of the nozzles may optionally be started by providing HTL to inputs of the nozzles, even by a manual pump, or by a starter pump which does not need to be used once the arms are rotating.

In some embodiments, providing compressed air from the compressed air source 242 to the nozzle may start the rotation.

It is noted that when the arms 244 of the configuration of FIG. 2B rotate, HTL flowing along the arms 244 toward the nozzles 232A 232B is accelerated along the arms 244, producing a suction force that, in some embodiments, can serve to suck the HTL from the HTL pool 234 toward the nozzles 232A 232B.

The pressure profile along the radial arms 244 supplying the HTL to the nozzles 232A 232B increases along the arms 244.

In some embodiments, compressed gas is injected into the HTL at a location along the arms 244.

In some embodiments, flow of the HTL along the arms may produce suction which can suck the gas into the arm. Adding the pressure of the pressurized gas to the sucking action of the flowing HTL produces a specific pressure at the injection location.

In some embodiments, the injection location is selected so that the HTL-and-gas flow outward along the arms 244, producing suction to suck HTL from the HTL pool 234 into the arms 244.

In some embodiments, the injection location is selected so that the flow of the HTL drags the gas bubbles toward nozzles 232A and 232B.

In some embodiments, the injection location is selected so that the gas pressure and the HTL pressure are approximately the same.

A pressure profile in the radial arms 244, supplying the HTL to the nozzles 232A 232B increases along the radial arm—the further from the center of rotation, the greater the pressure.

In some embodiments, injecting air into the HTL along the radial arms 244 at an air temperature lower than the HTL temperature results in heating the air along with increasing the pressure. The HTL, being an incompressible liquid, together with the increase in the pressure, arrests the air expansion, resulting in approximately-isochoric heating of the air along with the flow of the HTL toward the nozzles 232A 232B.

In some embodiments, air bubbles can reach the nozzles 232A 232B at a same or smaller size as when injected into the arms 244.

In some embodiments, air bubbles can reach the nozzles 232A 232B at a same temperature as the HTL.

It is noted that when the arms 244 rotate, centrifugal force is exerted on the HTL. Since liquid is usually denser than gas, even than compressed gas, the HTL is pushed away from the axis of rotation, and the bubbles, according to the Archimedes principle, are pushed toward the axis of rotation.

In some embodiments, for the bubbles to reach the nozzles, a drag force exerted by the HTL on the air bubbles dragging the bubbles along with the HTL flow is made to be stronger than the Archimedes force pushing the bubbles opposite the HTL flow.

In some embodiments, when air bubbles next to the nozzles 232A 232B the bubble size may be smaller than when injected into the arms, and the Archimedes force may be lower than at the injection location.

Figure 2C:
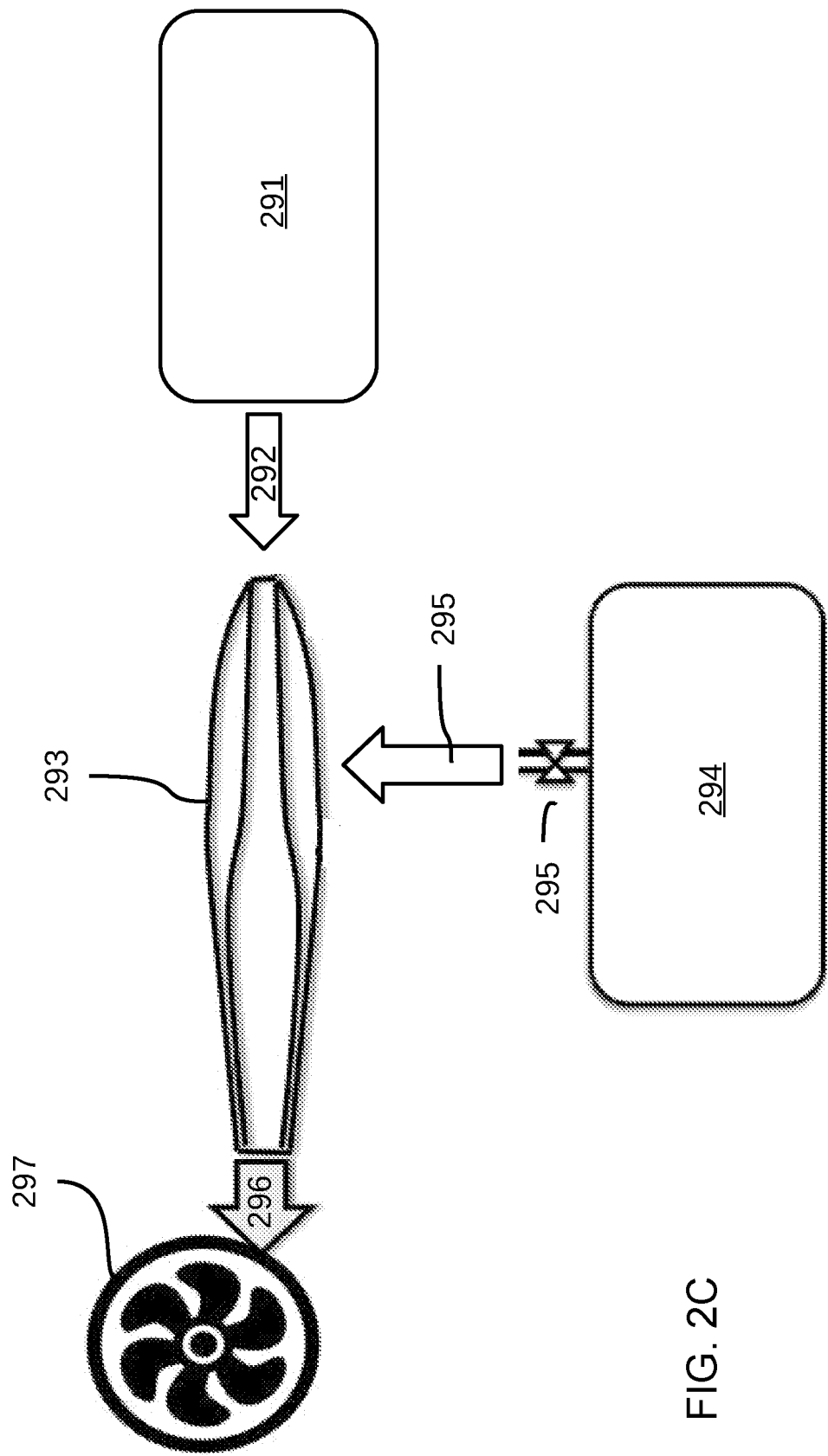
FIG. 2C is a simplified illustration of an HTL-turbine with a nozzle and a Pelton turbine according to an example embodiment.

Reference is now made to FIG. 2C, which is a simplified illustration of an HTL-turbine with a nozzle and a Pelton turbine according to an example embodiment.

FIG. 2C shows a HTL-turbine with a nozzle 293, emitting a gas-and-HTL mix 296 onto a Pelton turbine 297.

The nozzle 293 accepts input 292 of HTL from a source of HTL 291, and input 295 of compressed gas from a source of compressed gas 294.

In some embodiments, the source of compressed gas 295 is a source of compressed air.

In some embodiments, the source of gas includes a valve for controlling a rate of gas to be input 295 to the nozzle 293.

In some embodiments, the HTL input 292 into the nozzle 293 is hot, optionally significantly hotter than the air input 295.

A potential advantage of the configuration of FIG. 2C is an ability to generate power continuously.

In various embodiments, one, two, or more nozzles can optionally impinge upon the Pelton turbine 297.

In some embodiments, the Pelton turbine 297 powers an electric generator (not shown).

In some embodiments, the air expands isothermally in the nozzle 293.

In some embodiments, an HTL-turbine as described in FIG. 2C is optionally used continuously, being fed with compressed gas from one or more sources and/or chambers. This is in contrast with systems which charge a chamber with compressed air, and when the pressure in the chamber is used up, stop to recharge the chamber.

Figure 2D:
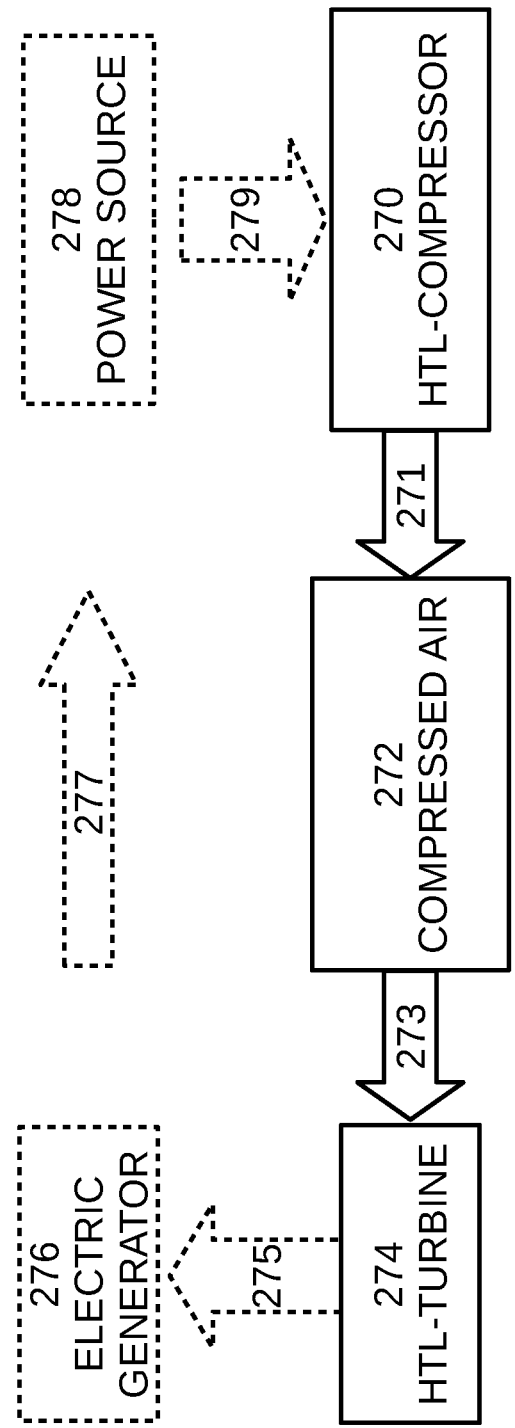
FIG. 2D is a simplified block diagram of a system according to an example embodiment.

Reference is now made to FIG. 2D, which is a simplified block diagram of a system according to an example embodiment.

FIG. 2D shows a case of powering an HTL-compressor 270 as described anywhere herein to compress 271 air into a compressed air chamber 272, to store energy, for example at time when energy cost is low (e.g. non-peak electricity demand) or when energy is available (e.g. from solar power or wind power), and using the compressed air from the chamber 272 to operate am HTL-turbine 274 as descried anywhere herein to produce power when needed.

In some embodiments, the HTL-compressor is optionally powered 279 by any power source 278, by way of some non-limiting examples by the electric grid, by a solar source, by a wind source, by a tidal source, In some embodiments, the HTL-turbine optionally provides power 275 to an optional electric generator 276.

In some embodiments, the electric generator 276 optionally feeds electricity into the electric power source 278 or the electric grid 278.

It is noted that the energy or power used to compress the air is optionally used during periods of excess power available, and/or in periods when the power is less expensive, and that that the energy or power is optionally returned to the power source 278 or the electric grid 278 during periods when extra power is required, and/or in periods when the power is more expensive.

In some embodiments, a HTL-turbine may optionally transfer HTL such as water from the HTL-turbine to a refrigeration system.

In some embodiments, the HTL-compressor may optionally transfer HTL such as water from the HTL-compressor to a heating system.

It is noted that the system for energy storage and recovery of FIG. 2D can use an HTL-compressor as shown in any one of FIGS. 2A, 2E, 3A and 3B and described herein.

Figure 2E:
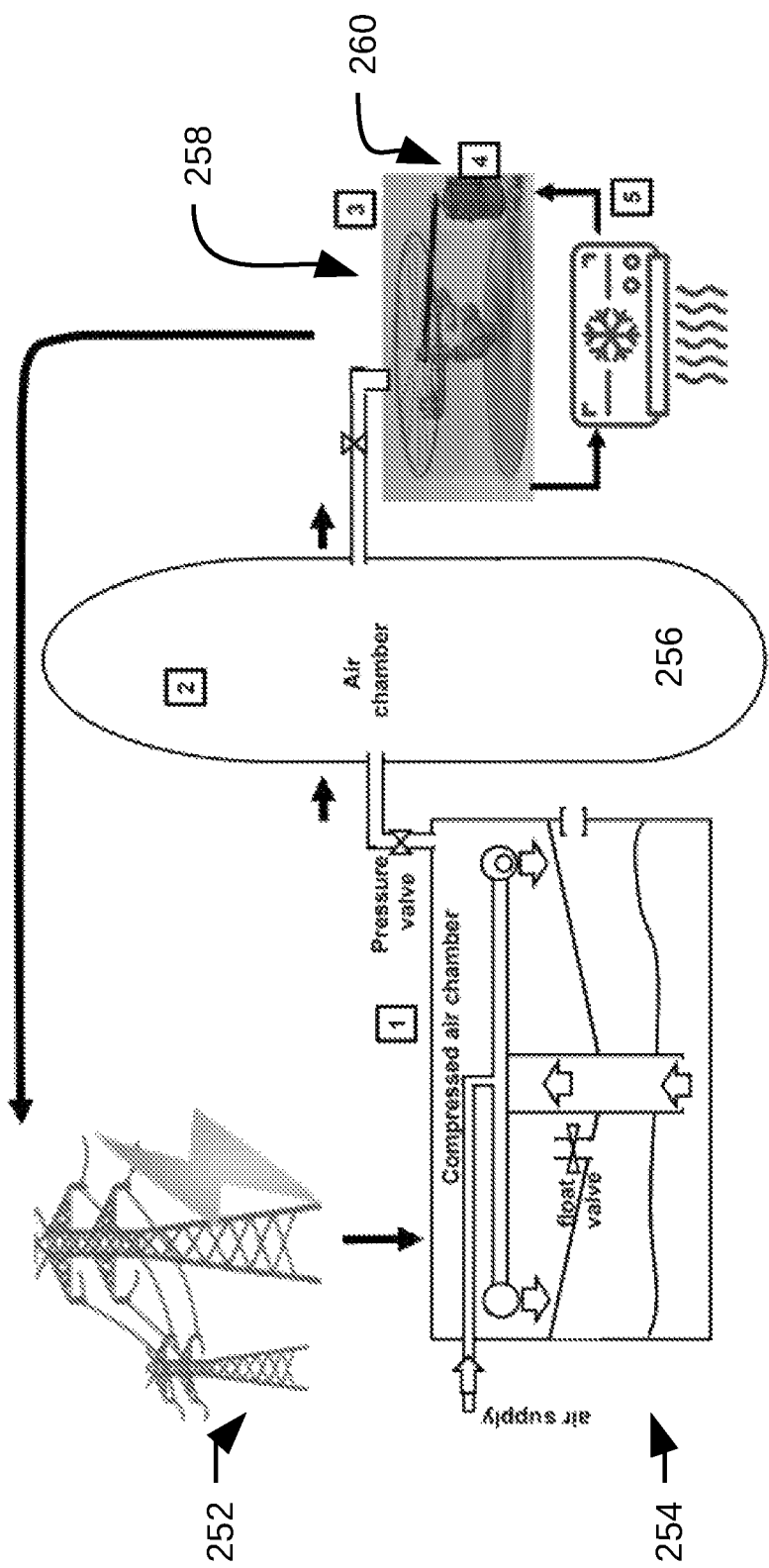
FIG. 2E is a simplified illustration of a system according to an example embodiment.

It is noted that the system for energy storage and recovery of FIG. 2E can use an HTL-turbine as shown in any one of FIGS. 2B, 2C, 2E and 4 and described herein.

Reference is now made to FIG. 2E, which is a simplified illustration of a system according to an example embodiment.

FIG. 2E relates to a method for and a system for energy storage and recovery.

An example described herein is a system for storing energy by compressing air and subsequently converting to electricity.

The example system includes an electric power source 252 providing power to an HTL-compressor 254, a compressed air tank 256, an HTL-turbine 258 operating on HTL and an electric motor 260.

In some embodiments, the HTL HTL-compressor 254 is an isothermal HTL-compressor, optionally as described in FIG. 2A.

It is noted that the HTL-turbine 258 operating on a mix of HTL and air is especially efficient at a continuous recovering energy of compressed air and converting to kinetic energy.

In some embodiments, the HTL-turbine uses water as HTL, which may optionally be at an ambient temperature, or heated by solar heaters, for example to 80° C., to operate in the turbine. In the solar heating option thermo-solar heaters can maintain the temperature of the water.

In some embodiments, the HTL may be cooled below ambient temperature by isothermal expansion, and/or optionally used as air condition, refrigeration or other liquid, and return at a higher temperature to the turbine.

Optionally, the cooled HTL may flow to a pool for re-heating before returning to the turbine.

Optionally, the cooled HTL is stored and used in the isothermal HTL-compressor for increasing efficiency.

Optionally, an HTL-turbine generates continuous and/or steady electricity.

Optionally air flow rate to the nozzle may be increased as the pressure in the air tank is reduced, maintaining the same isothermal work output.

When the HTL cools in the HTL-turbine, the pressure may be reduced due to lower isochoric heating.

In some embodiments, when the HTL temperature is reduced, a higher input pressure of gas is injected, to maintain the same pressure after the reduced-temperature isochoric heating, maintaining the same pressure and rotation frequency at varying HTL temperatures.

Optionally, one or more additional nozzles may operate at low pressure to balance total power output.

In some embodiments, when gas input pressure drops, the turbine may slow down.

In some embodiments, a gear (not shown) maintains HTL-turbine operation at varying pressure, to maintain rotation at a constant specific frequency.

Optionally, an electronic control of a gas input flow rate is used to maintain to maintain rotation at a constant specific frequency over various gas pressure levels.

In some embodiments, an electric varying frequency drive (VFD) is used to convert the varying frequency of the HTL-turbine to a constant electric frequency output.

In some embodiments, if or when HTL temperature is reduced, the pressure of injected gas is increased, so as to reach the same pressure after the isochoric heating.

Optionally, a few HTL-turbines at various pressures or various temperatures can operate simultaneously to produce a combined electric power supply, optionally providing an approximately constant combined electric power supply.

According to an example method:
electricity from a renewable source such as wind, photovoltaics, and other electricity sources may drive an isothermal continuous HTL-compressor, examples of which are described in relation to various Figures presented herein;
air compressed by the HTL-compressor may be stored; and
the stored compressed air may be used to drive an HTL-turbine, for example as described in relation to various Figures presented herein, and be used to produce electricity when desired.

Some potential advantages of such a system are:
operating continuous isothermal compression without a need for huge water tanks conventionally used to compress air. A saving in water tank size potentially provides a significant cost reduction.

A typical amount of HTL in the HTL-compressor may be even less than 1 ton. The water may be circulated to a pool for re-cooling the water, or hot water may be used for other application(s).

A typical amount of water at the turbine may be less than 1 ton, which enables cooling the water significantly and using the water for refrigeration and/or for air conditioning.

In contrast to isothermal expansion in tanks, where the pressure and electric output drops exponentially as the air expands, the nozzle in the HTL-turbine potentially supplies continuous and steady electricity. A slow drop in pressure may optionally is compensated for by the adjusting air flow rate to balance total energy output according to isothermal work being done. This potentially results in a continuous and steady power generation.

It is noted that the system for energy storage and recovery of FIG. 2E can use an HTL-compressor as shown in any one of FIGS. 2A, 2E, 3A and 3B and described herein.

It is noted that the system for energy storage and recovery of FIG. 2E can use an HTL-turbine as shown in any one of FIGS. 2B, 2C and 2E and described herein.

Figure 2F:
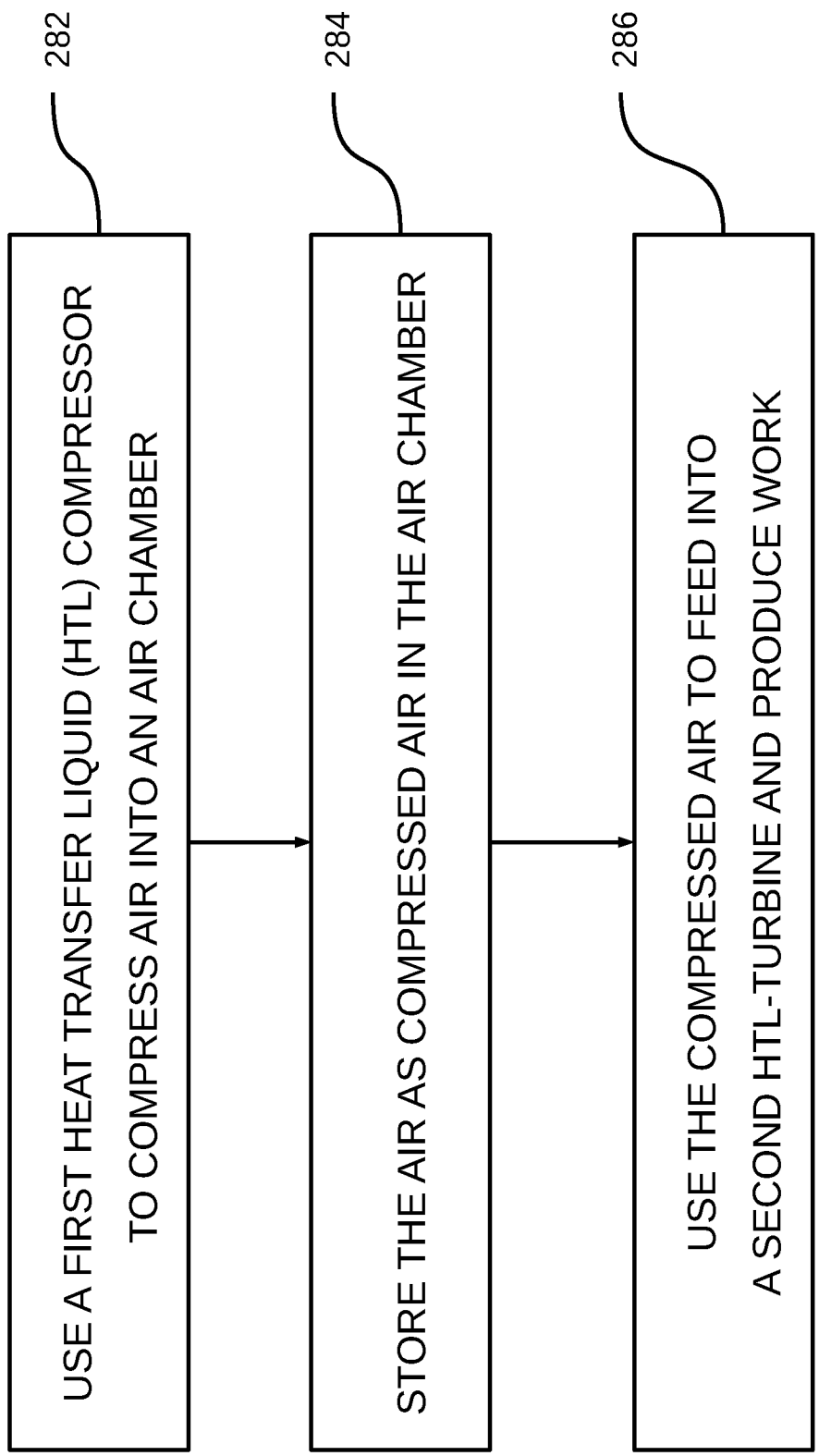
FIG. 2F is a simplified flow chart illustration of a method of energy storage and retrieval according to an example embodiment.

Reference is now made to FIG. 2F, which is a simplified flow chart illustration of a method of energy storage and retrieval according to an example embodiment.

The method shown by FIG. 2F includes:

using a first Heat Transfer Liquid (HTL) compressor to compress air into an air chamber (282);

storing the air as compressed air in the air chamber (284); and using the compressed air to feed into a second HTL-turbine and produce work (286).

Reference is now made to FIG. 3A, which is a simplified illustration of an HTL-compressor for isothermal gas compression according to an example embodiment.

FIG. 3A shows a HTL-compressor 300 which includes a tank or container 302, in which one or more engines or nozzles 304 are mounted on arms 306. The arms 306 are designed to rotate.

The container 302 contains HTL 308, which is made to flow through a pipe 310, through the arms 306, through the nozzles 304, and back out 312 into the container 302. Air flows through an air supply 314 and mixes with the HTL.

In some embodiments, the pipe 310 is shaped to gradually narrow along a direction of flow of the HTL, such a design potentially reduces static pressure below ambient pressure, according to Bernoulli's flow, potentially enabling suction of HTL into the pipe 310.

FIG. 3A shows a HTL-compressor which is different, possibly simplified, relative to the HTL-compressor shown in FIG. 2A, in that the pressure chambers 220 at the exit of the nozzles 208 are not used, and the nozzles 304 release and air-and-HTL mixture into the container 302.

In some embodiments, the air-and-HTL mixture exits the nozzles 304 into the container 302 at approximately zero kinetic energy, or at least a kinetic energy significantly lower than the energy input into the HTL-compressor, for example lower than 25% of the energy input into the HTL-compressor.

FIG. 3A shows a HTL-compressor which is different, potentially improved, relative to the HTL-compressor shown in FIG. 2A, in that the pipe 310 shown in FIG. 3A has a narrowing shape providing a Venturi effect on the HTL sucked up into the arms 306.

In some embodiments, the air supply 314 may provide compressed air.

In some embodiments, the air supply 314 is sucked up by virtue of HTL flowing outward along the rotating arms 306 sucking up the incoming air.

When the arms 306 and nozzles 304 rotate, optionally rotated by a mechanical shaft or an electric motor (not shown), centrifugal force acts upon HTL in the arms, forcing the HTL toward the nozzles 304 and out 312 of the nozzles 304. The movement of the HTL causes suction, sucking HTL 308 from the container 302. As the arms 306 rotate, the HTL 310 is sucked or pumped into the arms 306, and air is also sucked into the arms 306. As the air-and-HTL mixture moves outward along the arms 306, the air is compressed, and when the air-and-HTL mixture exits 312 into the container 302, pressure in the container 302 is raised.

The compressed air in the container 302 may be used, for example, by drawing through a pipe 316 leading from the container 302, which may or may not include a pressure valve 318.

FIG. 3A shows a turbine placed inside a potentially-compressed air chamber 302. The nozzles 304 are made to rotate by applying external work (by way of a non-limiting example by a mechanical shaft). Due to centrifugal force, HTL 308 such as, by way of a non-limiting example, water, is drawn from the container 302, upwards into the pipe 310, into the radial arms 304, and exits 312 at the nozzles 304.

The narrowing pipe acts as a Venturi pipe that reduces pressure and increases velocity. As HTL flows along the narrowing pipe 310, the pressure lowers due to the Venturi effect, and draws air enter the pipe 310 or at a meeting of the pipe 310 and the arms 306, or at the arms 306.

In some embodiments, the HTL-compressor 300 is configured to enable a gas-and-HTL mix to exit 312 the nozzle 304 at approximately zero kinetic energy when compared to input energy, or at least a kinetic energy significantly lower than the energy input into the HTL-compressor 300, for example lower than 25% of the energy input into the HTL-compressor 300.

In some embodiments, the air drawn into the HTL may be at ambient pressure. In some embodiments, the gas may be at higher-than-ambient pressure, optionally supplied from a source of compressed air, such as a compressed air container (not shown).

In some embodiments, the HTL may be at ambient temperature.

In some embodiments, the HTL may be colder than ambient temperature, which may potentially increase compression efficiency.

In some embodiments the colder HTL may optionally be supplied by an HTL-turbine, where the HTL may have been cooled by isothermal expansion. The HTL, for example water, circulated in the HTL-turbine supporting approximately isothermal expansion of air. At each pass through the nozzle, the HTL's temperature is slightly reduced, even if by a fraction of a degree. After many cycles, the HTL temperature drops, and so does efficiency. Replacing the cold HTL with hot HTL increases the efficiency of the HTL-turbine.

In some embodiments, cold HTL (e.g. water) emerging from the HTL-turbine, for example in the example of FIGS. 2C, 2D, 2E and 2F, may optionally be used in an HTL-compressor to cool compressed air, thereby increase the compressing efficiency.

In some embodiments, the HTL in an HTL-compressor is heated along with the isothermal compression and is later used in an HTL-turbine to convert that heat into electricity.

At each cycle through the HTL-compressor, the HTL's temperature is slightly heated, even if by a fraction of a degree. After many cycles, the HTL temperature rises, and so does efficiency. Replacing the hot HTL with colder HTL increases the efficiency of the HTL-compressor.

In some embodiments, the pipe 310 may optionally be vertical, as shown in FIG. 3A. In any case, FIG. 3A is intended to show a gradually narrowing pipe 310 for collecting HTL 308 and providing to the rotating arms 306, whether the pipe is vertical or not.

In some embodiments, the pipe 310 may optionally be static relative to the rotating arms 306, so optionally rotate in the HTL 308 in the container 302.

In some embodiments, the incoming air flow rate is controlled to be less than 20% by volume compared to the HTL flow rate, to maintain gas discontinuity, or HTL continuity, in the rotating arms 306, to maintaining centrifugal pressure of the HTL. In case of gas continuity, or HTL discontinuity, in the arms, the HTL will not induce sucking and centrifugal pressure effects, potentially disrupting operation of the HTL-compressor. The centrifugal pressure increases with the radial distance from the center of rotation. The centrifugal forces compress the air, while the HTL cools the air temperature, which is raised by the compression. The HTL typically has a much greater heat capacity, and the air temperature equalizes with the temperature of the HTL.

The compressed air is optionally collected in the container 302 and optionally exits through the pipe 316, if desired exiting continuously, while the HTL returns to the container 302 to be sucked back to the nozzles 304.

In some embodiments, an additional pipe (not shown) may be used to add or replace HTL in the container 302, optionally add or replace HTL with HTL at a different temperature.

By way of a non-limiting example, compressing air to 5 bars can optionally be done by having the entire container at 5 bars. The Venturi effect and the centrifugal forces reduce air pressure at the narrowing pipe 310 to below ambient pressure, resulting in air suction. The air flow to the rotating arms 306 by centrifugal forces and the pressure is raised to the pressure of 5 bar by the expanding end of the Venturi nozzle and by the centrifugal forces.

In some embodiments, air is compressed to a higher pressure than the pressure of the container 302. In some embodiments, the additional pressure is used to slow the HTL to exit from the nozzles 304 at approximately zero kinetic energy, or at least a kinetic energy significantly lower than the energy input into the HTL-compressor 300, for example lower than 25% of the energy input into the HTL-compressor 300.

Figure 3B:
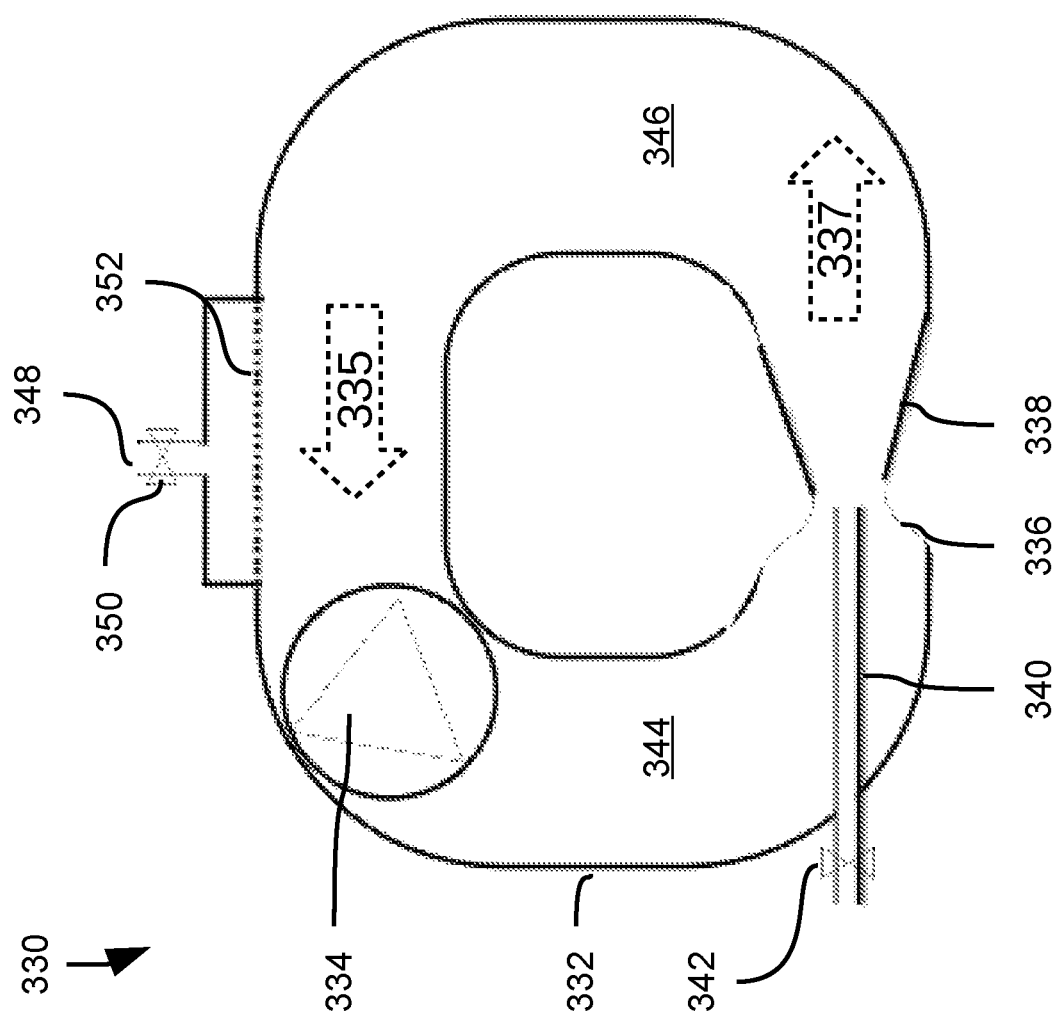
FIG. 3B is a simplified illustration of an HTL-compressor for continuous isothermal gas compression according to an example embodiment.

Reference is now made to FIG. 3B, which is a simplified illustration of a device for continuous isothermal gas compression according to an example embodiment.

FIG. 3B shows a HTL-compressor 330 which includes a closed-loop-shaped chamber 332, in which a pump 334 pumps HTL in a circular flow as shown by arrows 335 337.

The chamber 332 includes a narrowing portion 336, which produces a Venturi effect on the flowing HTL, a pipe 340 for introducing air into the flowing HTL, and a broadening portion 338.

When HTL flows through the narrowing portion 336, the HTL flows faster and at a lower pressure, which is the Venturi effect. The lower pressure may optionally be below ambient pressure, and draw in air through the pipe 340. In some embodiments, a valve 342 optionally controls whether the air is allowed into the chamber 332 and/or controls a rate at which air is allowed to flow in.

FIG. 3B also shows a pipe 348 for bleeding off compressed air from the HTL-compressor 330.

In some embodiments, the pipe 348 may include a valve 350. In some embodiments, the valve 350 may be a pressure valve which bleeds off air at a specific controlled pressure.

In some embodiments, the HTL-compressor 330 may optionally include a separator 352 which separates air to be let off through the pipe 348 and HTL which continues circulating in the chamber 332.

Optionally the separator operates by gravity, where the compressed air accumulates at an upper section of a right portion 346 of the chamber 332, in some embodiments, passing through optional holes, 352, and exiting through a pipe 348.

FIG. 3B shows a HTL-compressor which is different, possibly simplified, relative to the HTL-compressors shown in FIGS. 2A and 3A.

In some embodiments, the chamber 332 is kept at a desired pressure. The pump 334 maintains flow. The Venturi profile reduces HTL pressure below incoming air pressure, by way of a non-limiting example below ambient pressure, at the narrowing portion 336. The HTL cools the air along with the compression, thereby potentially increasing compression efficiency.

Head losses, or pressure losses, in the narrow section limit efficiency.

In some embodiments the HTL-compressor 330 induces isothermal compression. Air, by way of a non-limiting example, air at ambient pressure, flows into the Venturi section through the air pipe 340 which reaches the narrow Venturi section.

In some embodiments, a cross-section area of the air pipe is between 10%-50% of the HTL cross-section area at the narrow portion 336.

In some embodiments, maintaining diameter of air bubbles below 10 millimeters can potentially provide an isothermal compression of the bubbles by the HTL. Such bubble size is optionally achieved by having mesh holes smaller than 10 millimeters in diameter at an exit of the pipe 342, which is an entrance of the air to the chamber 332.

In some embodiments, turbulent flow may break the bubbles into small sizes. In the right portion 346 of the chamber 332, air is collected and exits through a pipe 348, optionally through a pressure valve 350.

In some embodiments, a high pressure is maintained in the entire chamber 332, except at the narrowing portion 336 of the Venturi nozzle. Under the high pressure, air bubbles are compressed by the HTL, which also equalizes temperature of the air bubbles along with compression.

Reference is now made to FIG. 3C, which is a simplified flow chart illustration of a method for continuous isothermal gas compression according to an example embodiment.

The method shown by FIG. 3C includes:
maintaining a flow of Heat Transfer Liquid (HTL) at a pressure higher than ambient pressure along a circular flow path around a closed-loop-shaped flow chamber (360), including:
causing the HTL to flow through a narrow cross-section Venturi profile of the flow chamber, causing a reduction of pressure of the flowing HTL below ambient pressure within the Venturi profile (362);
providing gas to be sucked into the Venturi profile of the flow chamber to mix with the HTL (364); and
bleeding off pressurized gas through a pressure valve at a non-Venturi section of the flow chamber (366).

Figure 3D:
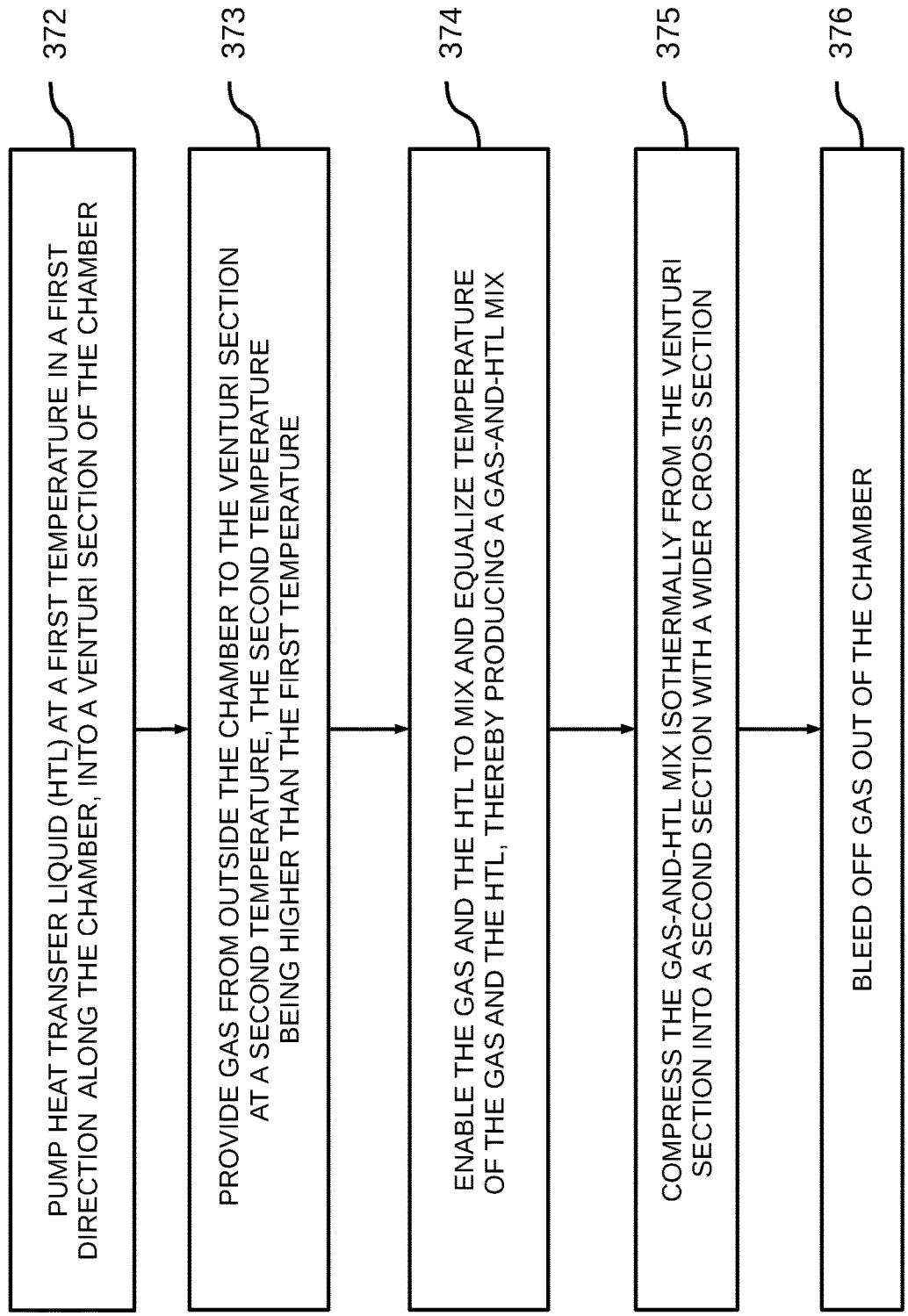
FIG. 3D is a simplified flow chart illustration of a method of compressing gas in a closed loop shaped flow chamber according to an example embodiment.

Reference is now made to FIG. 3D, which is a simplified flow chart illustration of a method of compressing gas in a closed-loop-shaped flow chamber according to an example embodiment.

The method shown by FIG. 3D includes:
pumping Heat Transfer Liquid (HTL) at a first temperature in a first direction along the chamber, into a Venturi section of the chamber (372),
providing gas from outside the chamber to the Venturi section at a second temperature, the second temperature being higher than the first temperature (373);
enabling the gas and the HTL to mix, thereby producing a gas-and-HTL mix (374);
compressing the gas-and-HTL mix isothermally from the Venturi section into a second section with a wider cross section (375); and
bleeding off gas out of the chamber (376),
wherein the Venturi section has a narrowing cross section, which provides a Venturi effect for the HTL flowing along the Venturi section, lowering pressure of the HTL to below a pressure outside the chamber.

Figure 3E:
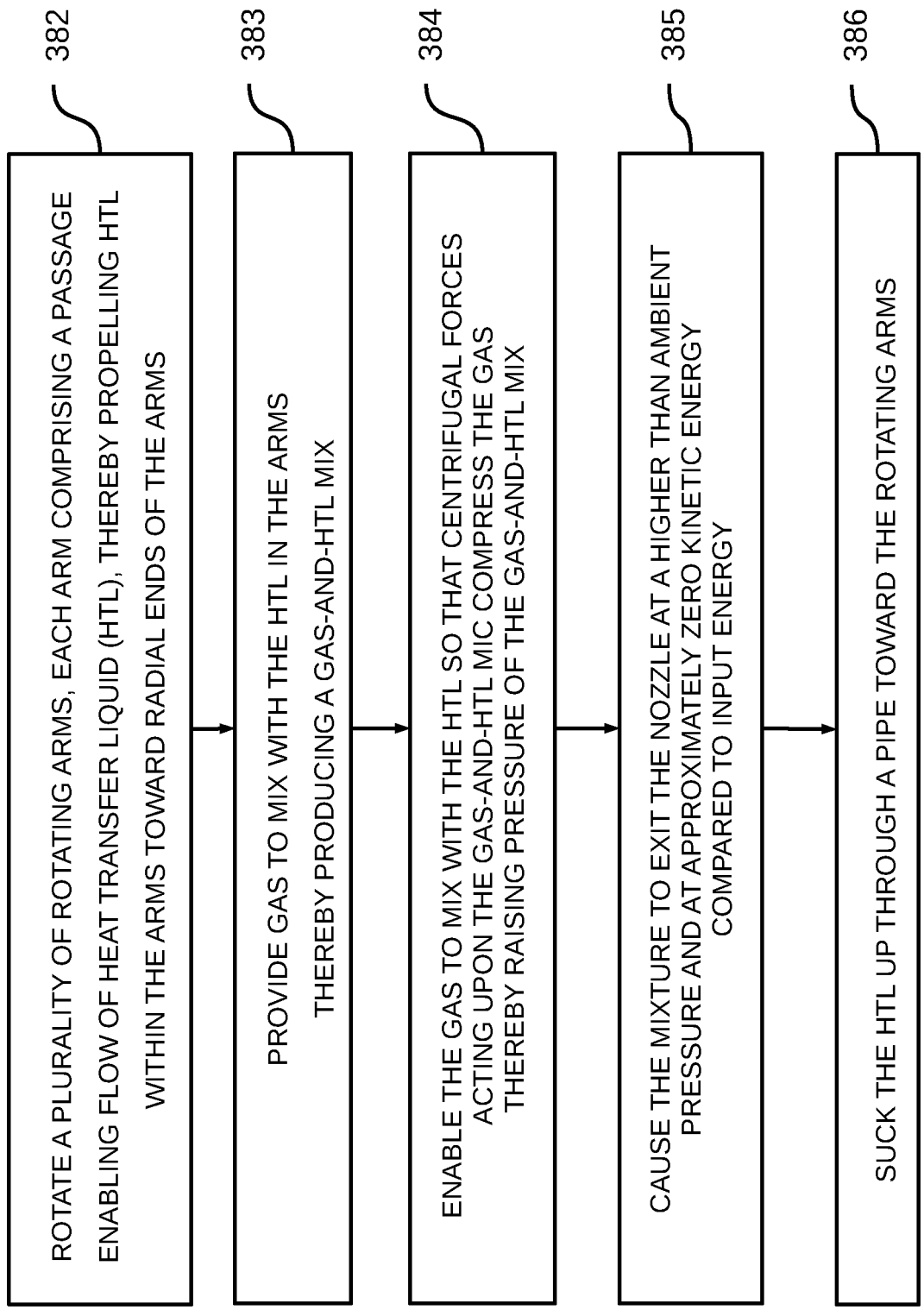
FIG. 3E is a simplified flow chart illustration of a method of compressing gas in a chamber for compressing gas according to an example embodiment.

Reference is now made to FIG. 3E, which is a simplified flow chart illustration of a method of compressing gas in a chamber for compressing gas according to an example embodiment.

The method shown by FIG. 3E includes:

rotating a plurality of rotating arms, each arm comprising a passage enabling flow of Heat Transfer Liquid (HTL), thereby propelling HTL within the arms toward radial ends of the arms (382);

providing gas to mix with the HTL in the arms, thereby producing a gas-and-HTL mix (383);

enabling the gas to mix with the HTL so that centrifugal forces acting upon the gas-and-HTL mix compress the gas, thereby raising pressure of the gas-and-HTL mix (384);

causing the mixture to exit the nozzle at a higher than ambient pressure and at approximately zero kinetic energy compared to input energy (385); and sucking the HTL up through a pipe toward the rotating arms (386).

In some embodiments, an HTL-turbine realizes a Stirling cycle by using isothermal compression of a gas such as air, Nitrogen, etc. One method is by using water to fill tanks, thereby compressing gas in the tanks. In such a way isothermal compression is achieved by spraying water or bubbling gas into the water, thereby increasing a surface area for heat transfer, and increasing a heat transfer rate between the gas and the water. Such a system typically requires huge tanks, which is costly. Also, the operation of such a compressor causes an exponential change in pressure in the tank, which fluctuates a load that the compressor exerts on its power source.

Figure 4:
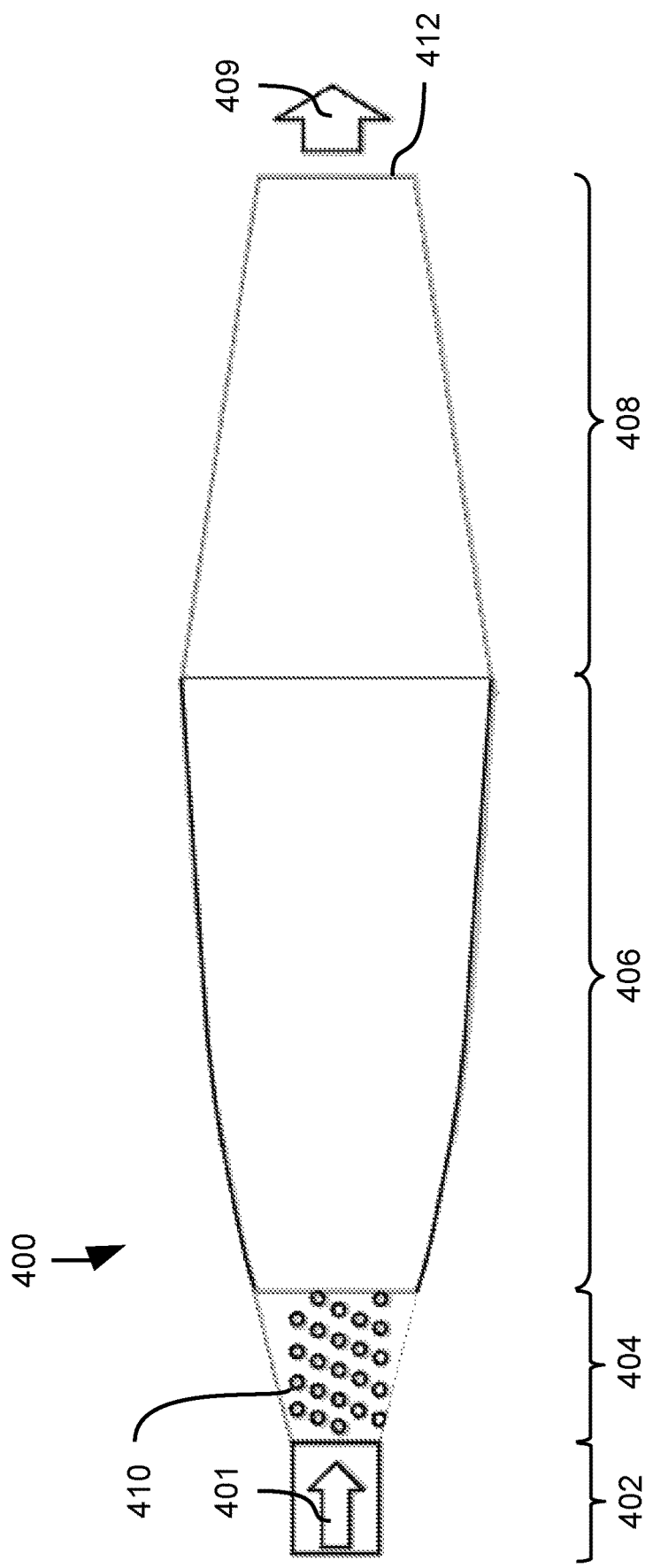
FIG. 4 is a simplified illustration of a nozzle for an HTL-turbine for producing thrust based on mixing air and HTL according to an example embodiment.

Reference is now made to FIG. 4, which is a simplified illustration of a nozzle for an HTL-turbine nozzle in the HTL-turbine for producing thrust based on mixing air and HTL according to an example embodiment.

FIG. 4 shows an example embodiment of an HTL-turbine shaped as a nozzle 400, where HTL enters 401 the nozzle 400 from the left, and exits 409 the nozzle 400 from the right. The example nozzle includes a first injection or mixing section 404, where air is injected into the nozzle 400, mixing with the HTL, a second gradually widening section 406, a third gradually narrowing section 408, and an exit 412.

In some embodiments, the nozzle 400 includes an optional entry section 402 or pipe 402 for guiding HTL into the nozzle 400.

In some embodiments, the nozzle may optionally include a pipe (not shown) feeding HTL into the nozzle from a non-axial direction.

In some embodiments, the nozzle 400 includes a mixing chamber 404, the injection section 404 where air enters HTL at a pressure close to stagnation pressure, optionally more than 50% of the stagnation pressure. Typically, higher pressure potentially enables generating more power.

In some embodiments, a feature of the HTL-turbine nozzle includes isochoric heating (heating at constant volume) in the second gradually widening section 406, which increases the amount of work produced by the HTL-turbine, due to the increase in pressure caused by the heating.

The mixing chamber 404 or injection section 404 is optionally located in a section of the HTL-turbine nozzle where pressure is lower than the stagnation pressure modified by dividing by a ratio of the gas and the HTL temperatures.

Taking by way of a non-limiting example HTL as molten salt at 830K and air is injected at 300K, then the mixing chamber is located at a section of the HTL-turbine where the static pressure is lower than 300/830-0.36 of the stagnation pressure. In some embodiments, the air is controlled to enter the HTL at a pressure lower than 36% of the stagnation pressure.

In such an example, $P_1 < 0.36 P_{st}$, that is, the pressure in the first mixing chamber 404 is optionally controlled to be less than 0.36 of stagnation pressure.

In such an example, after isochoric heating pressure increases by a factor dependent upon the temperatures (1/0.36=2.77). The pressure at the end of the isochoric heating section 406 is $P_2$, which is maintained below stagnation pressure, that is, $P_2 = 2.77 * P_1 < P_{st}$.

Taking another non-limiting example, for thermal oil at 620K and Nitrogen at 300K this ratio is 300/620=0.48, or 48% of the stagnation pressure.

According to Bernoulli:

$$P_{st} = P_1 + \frac{1}{2}\rho U_1^2 = P_2 + \frac{1}{2}\rho U_2^2 \qquad \text{Equation 1}$$

where $P_{st}$ is the stagnation pressure, $P_1$ is the pressure at the end of the mixing chamber 404, $\rho$ is the density of the gas-and-HTL mixture, $U_1$ is the HTL velocity at the end of the mixing chamber 404, $P_2$ is the pressure at the end of the second gradually widening section 406, which is where isochoric heating happens, and $U_2$ is the HTL velocity at the end of the second gradually widening section 406, which is the isochoric heating section.

In some embodiments, the nozzle 400 has a specific shape, where the mixing chamber 404 is at a narrow section, followed by a broader section 406 which is an isochoric heating section where pressure potentially reaches its highest value, although still lower than the stagnation pressure.

FIG. 4 show such a nozzle 400 including an optional inlet 402, a mixing chamber 404, a broadening isochoric heating chamber 406, and an outlet section 408 where the pressure drops toward ambient pressure, which potentially converts heat energy into kinetic energy of an emerging jet.

In some embodiments, the outlet section 408 optionally has a converging diverging shape (not shown in FIG. 4), similar to a de Laval supersonic nozzle designed for bubbly media, where the exit pressure can be below ambient pressure, potentially producing a higher end-velocity than when the exit pressure is at ambient pressure. In a de Laval convergent-divergent outlet, at a narrow section (at the end of convergence before divergence) the velocity of the gas-and-HTL mixture reaches and even exceeds the speed of sound (Mach-1), which speed depends on the velocity, the static pressure, and the fraction of gas in the volume of the gas-and-HTL mix.

In some embodiments, the third gradually narrowing section 408, which is convergent, increases velocity of the gas-and-HTL mixture, even up to the speed of sound (Mach-1) and beyond.

In some embodiments, the third gradually narrowing section 408, is optionally shaped as a de Laval nozzle, in some embodiments increasing velocity of the gas-and-HTL mixture, even up to the speed of sound (Mach-1) and beyond.

The HTL-compressors described herein, and the HTL-turbines described herein, are described with reference to mixing air, or any other gas, and HTL.

An aspect of some embodiments includes mixing exhaust gasses from an engine with HTL, for heating the HTL in an HTL-turbine as described herein.

Exhaust gasses may sometimes be gathered with and their pressure, speed, or momentum, may potentially provide extra energy to the HTL-turbine described herein.

Exhaust gasses may contain $CO_2$.

In some embodiments, the HTL is selected so as to include a material which absorbs $CO_2$.

In some embodiments, the material which absorbs $CO_2$ is selected so as to interact with the $CO_2$ and produce a new material which can be removed from the HTL, thereby removing $CO_2$ from the HTL and collecting the $CO_2$ for disposal elsewhere.

In some embodiments, a supply of the new material is optionally continually added to the HTL, to compensate for the material-plus-$CO_2$ which is removed from the HTL.

In some embodiments, the material which absorbs $CO_2$ is optionally selected so as to change properties of the HTL. By way of a non-limiting example, the material which absorbs $CO_2$ may be mixed with a salt to reduce or increase a melting temperature of the mixture, producing a molten salt HTL.

The use of the exhaust gasses from a turbine as a heat source and as a low-oxygen gas source is described herein.

In some embodiments, a direct contact heat exchanger is optionally used between molten salt and exhaust gas. The heat exchanger optionally uses the exhaust gas to heat the molten salt, and the molten salt is optional used to power an HTL-turbine, optionally as described herein.

A potential benefit of a direct heat exchanger is by not requiring a costly heat exchanger body, and/or that the direct heat exchanger may potentially enable reducing $CO_2$ emissions.

Further potential benefits include:

Simplicity: a direct contact heat exchanger doesn't require a large surface area and costly structure.

The molten salt may be chosen to include known $CO_2$ capture materials to absorb the $CO_2$ from the exhaust gas, thereby reducing the $CO_2$ emissions, which is desired for the environment.

Some non-limiting examples of such $CO_2$ capture materials include molten halide salt-based mixtures containing CaO, or MgO, or SrO, or BaO, which can absorb $CO_2$ and solidify. The general reaction can be for example:

$MO(s)+CO_2(g) \leftrightarrows MCO3(s)$ where M may be, by way of some non-limiting examples, Mg, Ca, Sr, and Ba.

A few non-limiting examples of $CO_2$ absorbing materials include CaO, MgO, $NaCo_3$ (+$H_2O$), $KCO_3$ (+$H_2O$), and $Na_2O$.

In some embodiments, these materials can optionally be added to one or more molten salts to absorb $CO_2$.

Above-mentioned article titled "Carbon capture in molten salts" by Espen Olsen and Victorija Tomkute describes some examples of such material properties.

In some embodiments, the absorption of $CO_2$ by CaO results in formation of CaCO3 in the solid state. Optionally, adding a small amount (by way of a non-limiting example less than 20% weight) of CaO to solar salts (by way of a non-limiting example to a mix of approximately 60% NaNO3, 40% KNO3) can maintain a low melting point while allowing $CO_2$ absorption.

In some embodiments, a direct contact heat exchanger is used where exhaust gas flows upstream while molten salt drops flow downstream.

In some embodiments, in order to match a heat transfer coefficient with the flow rate in a direct heat exchanger column, a packed column is optionally used, which slows the molten salt velocity and increases heat transfer surface area. Such use potentially induces a counter flow direct contact heat exchanger, where exhaust gas temperature and molten salt temperature are similar at most cross-sections of the column.

For some embodiments, a packed column may not be suitable for the formation of solids as a product of $CO_2$ absorption, such as, by way of a non-limiting example CaCO3, since the solids may block the packed bed gaps. To overcome this problem, a baffle tray direct contact heat exchanger may be used, where the CaCO3 solids are collected at a bottom of the tray, since density of the CaCO3 is higher than that of the other components of the solar salt.

Figure 5A:
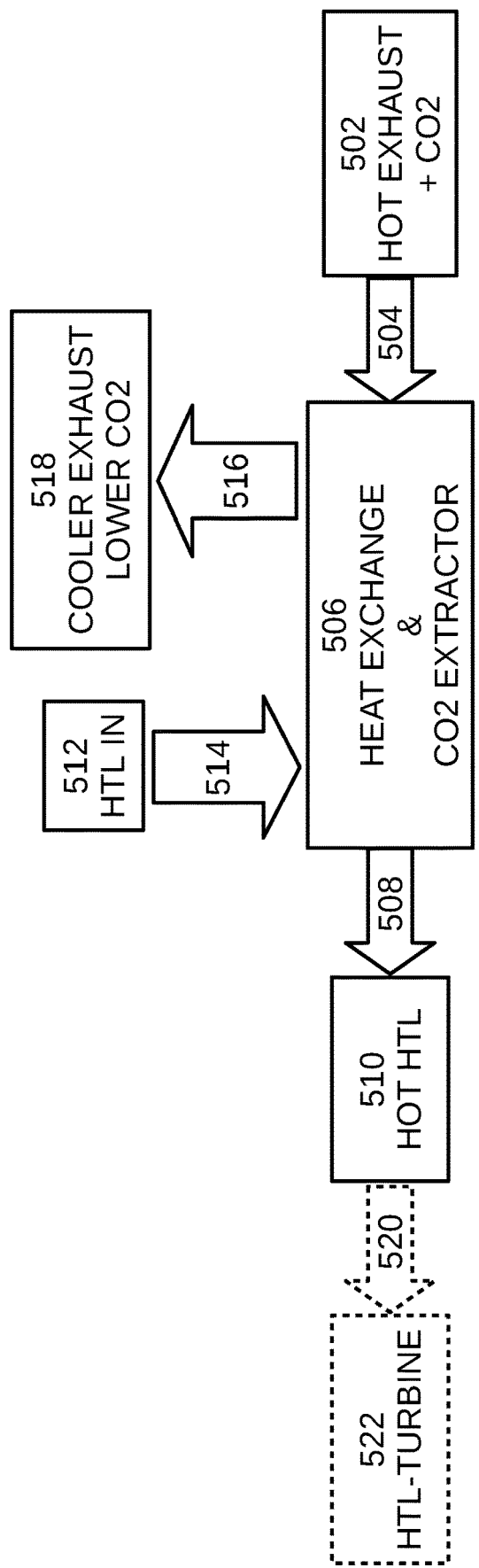
FIG. 5A is a simplified block diagram of a system for obtaining heat from hot exhaust gas while also cleaning the exhaust gas of $CO_2$ according to an example embodiment.

Reference is now made to FIG. 5A, which is a simplified block diagram of a system for obtaining heat from hot exhaust gas while also cleaning the exhaust gas of $CO_2$ according to an example embodiment.

FIG. 5A shows a source of hot exhaust gasses 502 which include $CO_2$, feeding into 504 a heat exchanger & $CO_2$ extraction device 506. The heat exchanger & $CO_2$ extraction device 506 also accepts input 514 of HTL 512.

In the heat exchanger & $CO_2$ extraction device 506, heat from the hot exhaust gasses 502 is used to heat the incoming HTL, such that the heat exchanger & $CO_2$ extraction device 506 provides an output 508 of hot HTL 510, and output 516 of cooler exhaust gasses 518.

Also in the heat exchanger & $CO_2$ extraction device 506, the HTL absorbs $CO_2$ from the input exhaust gasses 502, such that the output 518 of exhaust gasses contains less $CO_2$.

In some embodiments, the hot HTL 510 is optionally fed into an HTL-turbine 522, to produce energy, by way of a non-limiting example to produce electric energy.

The energy produced by the HTL-turbine can be stored by batteries, or used in the HTL-compressor and stored as compressed gas.

In some embodiments, the hot HTL 510 is optionally fed into an HTL-compressor (not shown) to store energy, by way of a non-limiting example by compressing air into a compressed air chamber (not shown).

Figure 5B:
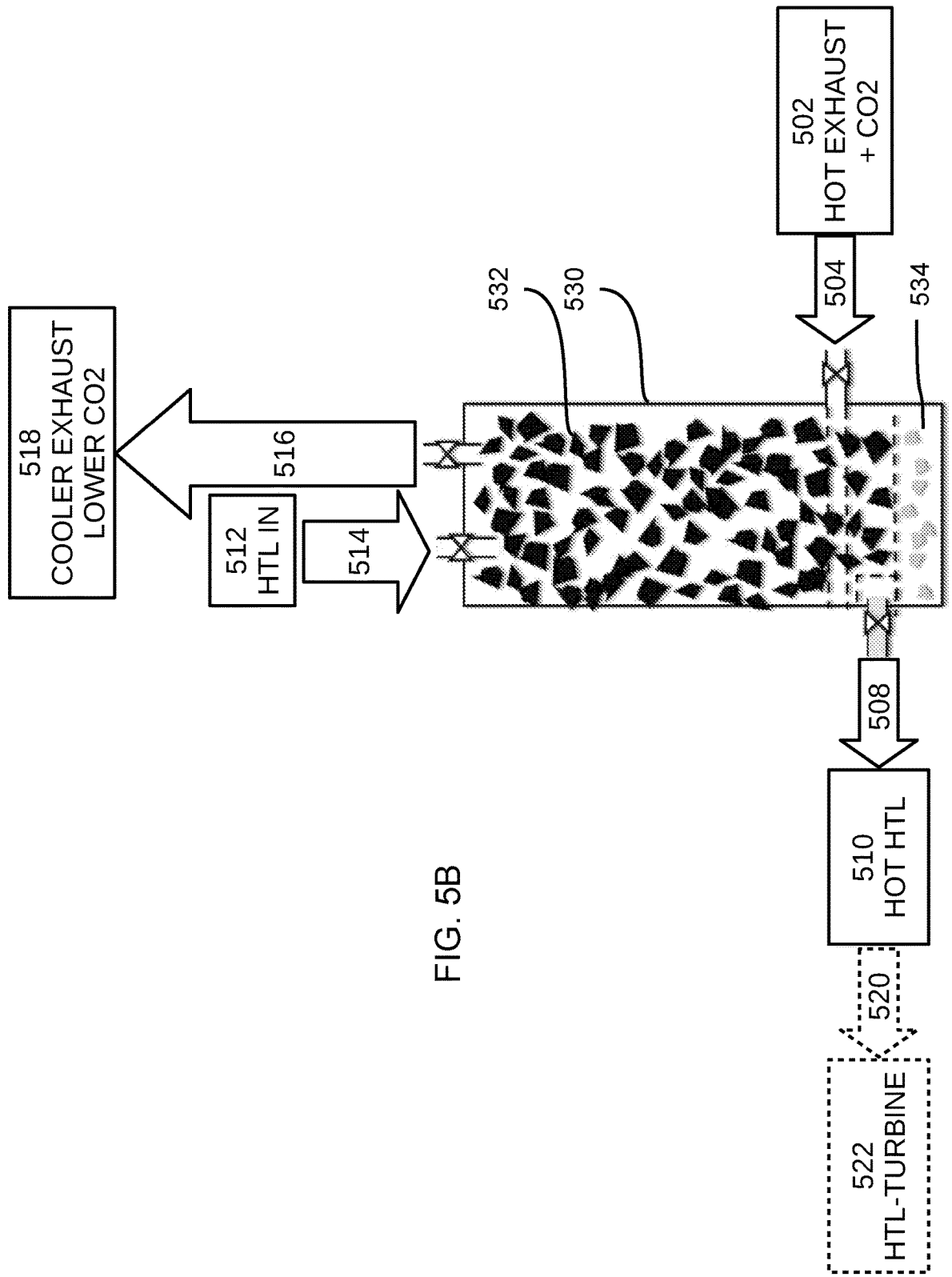
FIG. 5B is a simplified block diagram of a system for obtaining heat from hot exhaust gas while also cleaning the exhaust gas of $CO_2$ according to an example embodiment.
Figure 5C:
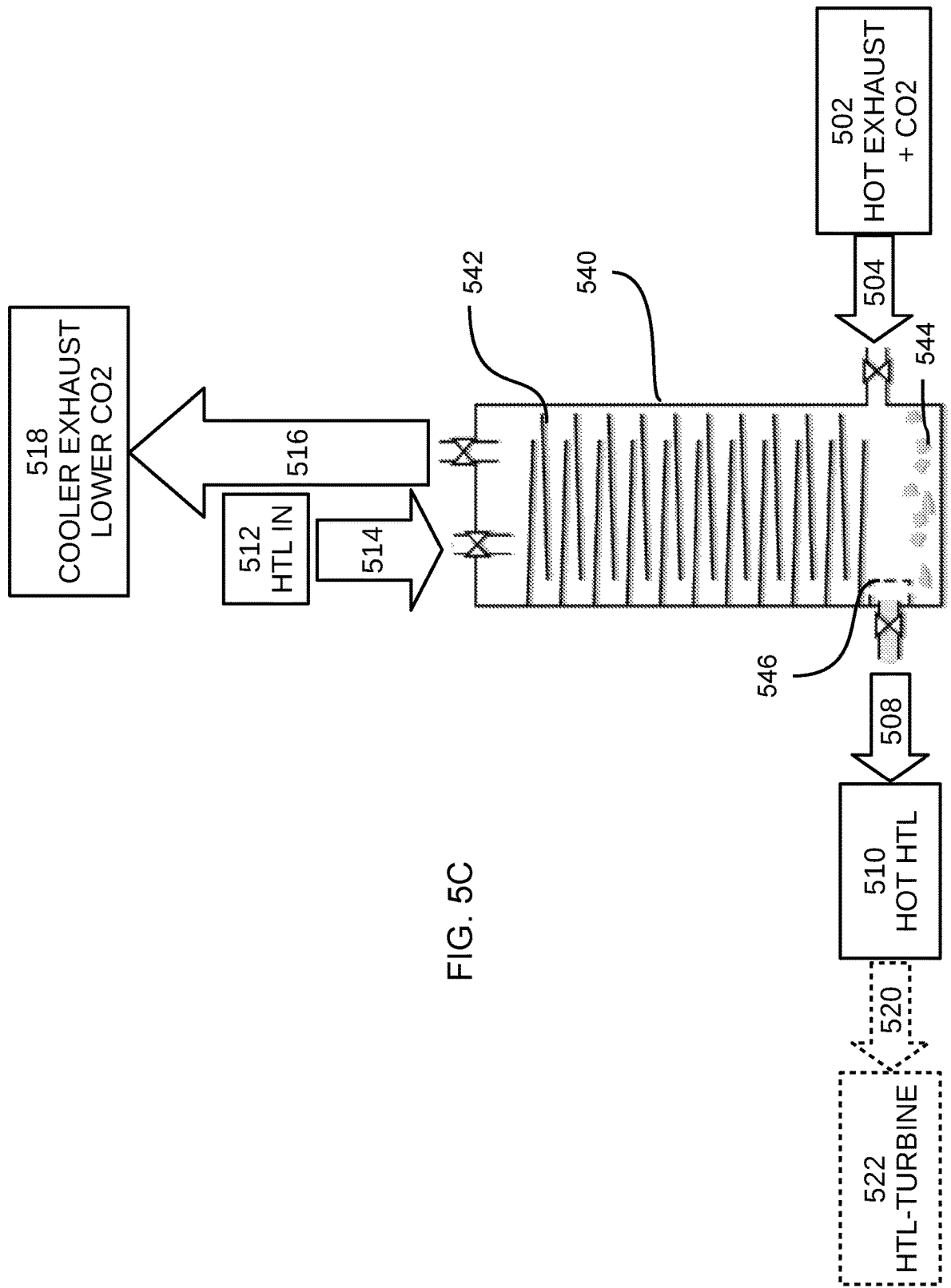
FIG. 5C is a simplified block diagram of a system for obtaining heat from hot exhaust gas while also cleaning the exhaust gas of $CO_2$ according to an example embodiment.

A non-limiting example of using the system of FIG. 5A, as well as the systems of FIGS. 5B and 5C, can be: exhaust gasses containing $CO_2$ 502 at a high temperature for example, of about 530 C are fed into 504 the heat exchanger & $CO_2$ extraction device, and HTL 512 at a lower temperature, for example of 140 C is fed into 514 the heat exchanger & $CO_2$ extraction device, and after heat exchange and $CO_2$ absorption, hotter HTL 510 is output 508 from the heat exchanger & $CO_2$ extraction device at a temperature of about 530 C, and cooler exhaust with less $CO_2$ at a temperature of about 140 C is output 516 from the heat exchanger & $CO_2$ extraction device.

In some embodiments, a HTL-turbine may optionally transfer HTL such as water from the HTL-turbine to a refrigeration system.

In some embodiments, the HTL-compressor may optionally transfer HTL such as water from the HTL-compressor to a heating system.

It is noted that the output temperatures typically depend on the efficiency of the heat exchanger. A temperature of output 508 HTL 510 is potentially very close to a temperature of input 504 exhaust gasses 502, and a temperature of output 516 exhaust gasses 518 is potentially very close to a temperature of input 514 HTL 512.

Reference is now made to FIG. 5B, which is a simplified block diagram of a system for obtaining heat from hot exhaust gas while also cleaning the exhaust gas of $CO_2$ according to an example embodiment.

FIG. 5B is similar to FIG. 5A, with the heat exchanger & $CO_2$ extraction device being a direct contact heat exchanger 530 between exhaust gasses 502 and HTL 512, by way of a non-limiting example the HTL 512 being in the form of molten salt.

FIG. 5B depicts a direct contact heat exchanger 530 with a packed bed resistive to flow of the molten salt. In some embodiments, the packed bed contains stones 532 that do not interact with molten salt HTL. The HTL drips onto the stones from top to bottom, while hot exhaust gas enter from the bottom and exit at the top. This geometry is similar to a cross flow heat exchanger where a packed bed or stones create a temperature gradient along with the flow. Optionally, the molten salt HTL includes $CO_2$-absorbing materials.

In some embodiments, the $CO_2$-absorbing materials solidify upon absorbing $CO_2$. In such a case, the solids 534 may aggregate at a bottom of the heat exchanger 530 and do not exit with the HTL 510 to the HTL-turbine 522.

In some embodiments, the aggregated solids are collected (not shown).

Reference is now made to FIG. 5C, which is a simplified block diagram of a system for obtaining heat from hot exhaust gas while also cleaning the exhaust gas of $CO_2$ according to an example embodiment.

FIG. 5C is similar to FIGS. 5A and 5B, with the heat exchanger & $CO_2$ extraction device being a direct contact heat exchanger 540 constructed with fins 542 to extend flow of the HTL and produce a temperature gradient along the flow path. The HTL flows from the top to bottom while the exhaust gas flow from bottom to top. In such a cross flow heat exchanger the HTL exits at a temperature of about the entrance temperature of the incoming gas, while the gas exits at a temperature about the entering temperature of the HTL.

In some embodiments, $CO_2$-absorbing materials solidify and drop along the fins 542 along with the HTL flow until reaching an optional filter 546 which prevents the solids 544 from exiting the heat exchanger 540 and reaching the HTL-turbine 522.

In some embodiments, the solids 644 are optionally aggregated and collected (not shown).

Typically exhaust gases are at temperatures above 140 C. In such cases the molten salt can be, by way of a non-limiting example, HITEC salt, which is molten at such temperatures and up to 530 C.

In some embodiments, mixing the HITEC molten salt with $CO_2$-absorbing salts, at a portion of less than 30% enables absorbing the $CO_2$ while not significantly changing the operating temperatures of the mixture.

Figure 5D:
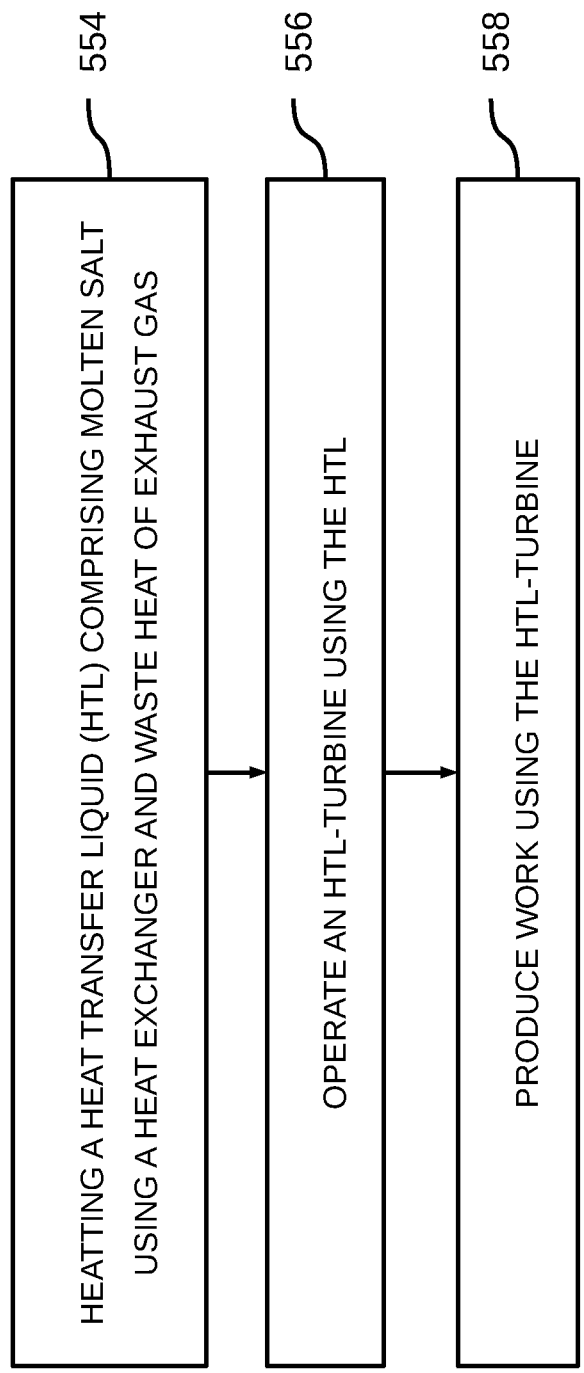
FIG. 5D is a simplified flow chart illustration of a method for converting waste heat of exhaust gas to work according to an example embodiment.

Reference is now made to FIG. 5D, which is a simplified flow chart illustration of a method for converting waste heat of exhaust gas to work according to an example embodiment.

The method shown by FIG. 5D includes:
heating a heat transfer liquid (HTL) comprising molten salt using a heat exchanger and waste heat of exhaust gas (554);
operating an HTL-turbine using the HTL (556); and
producing work using the HTL-turbine (558).

Figure 5E:
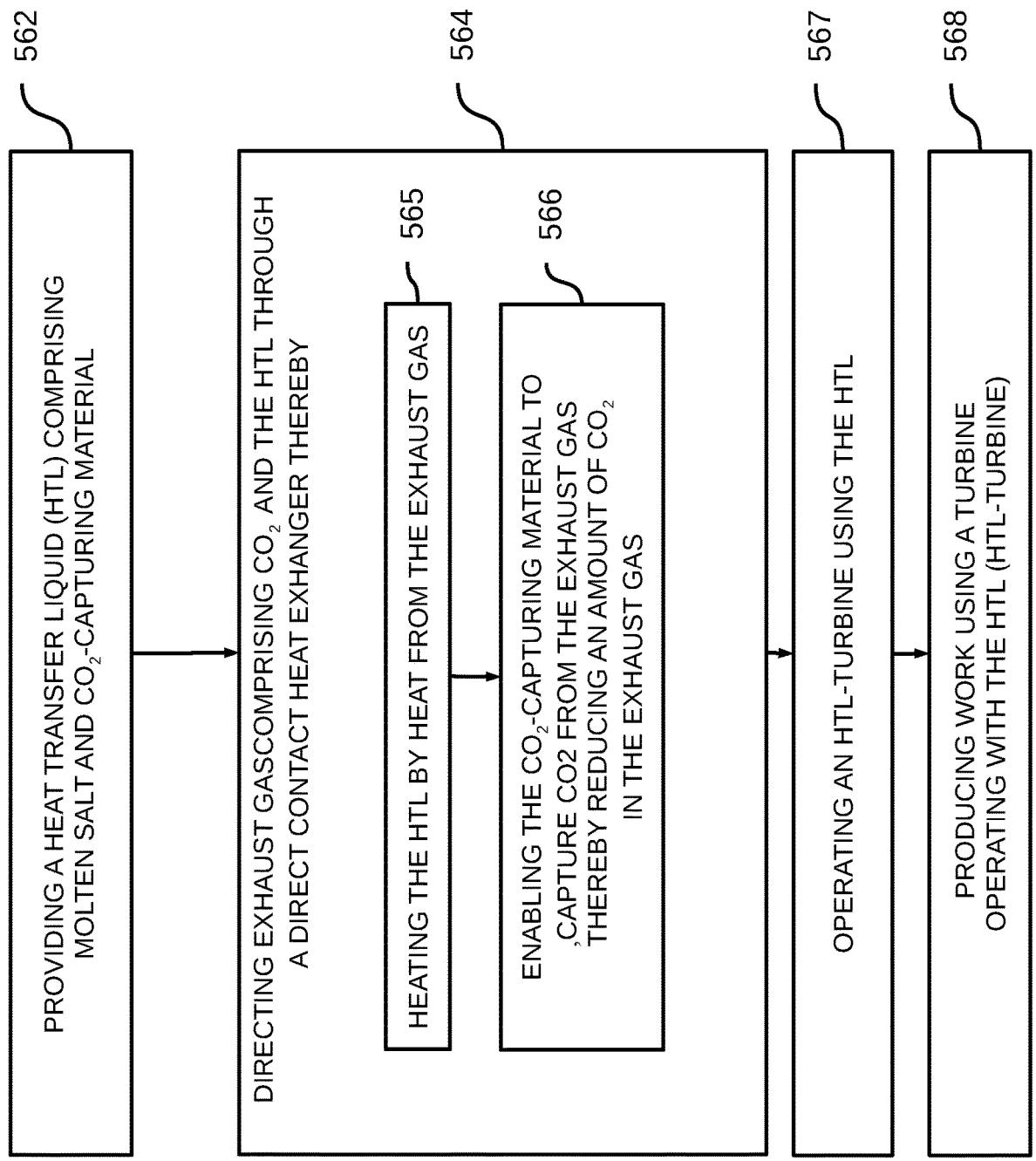
FIG. 5E, which is a simplified flow chart illustration of a method for converting waste heat of exhaust gas to work while also reducing $CO_2$ from the exhaust gas according to an example embodiment.

Reference is now made to FIG. 5E, which is a simplified flow chart illustration of a method for converting waste heat of exhaust gas to work while also reducing $CO_2$ from the exhaust gas according to an example embodiment.

The method shown by FIG. 5E includes:
providing a heat transfer liquid (HTL) comprising molten salt and $CO_2$-capturing material (562);
directing exhaust gas comprising $CO_2$ and the HTL through a direct contact heat exchanger (564) thereby:
heating the HTL by heat from the exhaust gas (565); and
enabling the $CO_2$-capturing material to capture $CO_2$ from the exhaust gas, thereby reducing an amount of $CO_2$ in the exhaust gas (566);
operating an HTL-turbine using the HTL (567); and
producing work using a turbine operating with the HTL (HTL-turbine) (568).

It is expected that during the life of a patent maturing from this application many relevant $CO_2$ capturing materials and/or $CO_2$ absorbing materials will be developed and the scope of the terms $CO_2$ capturing material and/or $CO_2$ absorbing material is intended to include all such new technologies a priori.

As used herein with reference to quantity or value, the term "about" means "within ±25% of".

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for converting waste heat of exhaust gas to work
    while reducing $CO_2$ emission in the waste heat, comprising:
    feeding into a direct contact heat exchanger an exhaust gas that comprises $CO_2$ and a heat transfer liquid (HTL) that comprises molten salt, thereby resulting in mixing the HTL with the exhaust gas and heating of the HTL to obtain heated HTL;
    wherein the HTL comprises a $CO_2$-capturing material to absorb the $CO_2$ from the exhaust gas, and said mixing resulting in the $CO_2$-capturing material capturing the $CO_2$ from the exhaust gas, thereby reducing an amount of $CO_2$ in the exhaust gas;
    operating an HTL-turbine for performing an isothermal or quasi-isothermal expansion with the heated HTL following said mixing; and
    producing work using the HTL-turbine.

2. The method of claim 1,
    wherein the HTL exits the heat exchanger at a temperature of about the entrance temperature of the exhaust gas, while the exhaust gas exits the heat exchanger at a temperature about the entering temperature of the HTL.

3. The method of claim 1,
    wherein said $CO_2$ capturing material solidifies upon absorbing $CO_2$, and the method further comprising removing the $CO_2$ capturing material which has absorbed $CO_2$ from the exhaust gas before reaching the HTL-turbine.

4. The method according to claim 1 wherein the $CO_2$-capturing material comprises a material selected from a group consisting of:
    CaO;
    MgO;
    $NaCO_3$ (+$H_2O$);
    $NaCO_3$;
    $KCO_3$ (+$H_2O$);
    $KCO_3$; and
    $Na_2O$.

5. The method according to claim 1, wherein producing work comprises producing electricity.

6. The method according to claim 1, wherein $CO_2$ capturing material which has absorbed $CO_2$ from the exhaust gas is removed before reaching the HTL-turbine.

7. The method according to claim 1, wherein the molten salt is in a molten state in a temperature range of between 140° C.-530° C.

8. The method according to claim 1, wherein said heating comprises heating the HTL that comprises molten salt to a temperature above 670K, using a direct heat exchanger and waste heat of exhaust gas.

9. The method according to claim 1, wherein interaction of the $CO_2$ capturing material with the $CO_2$ produces a new material which is removable from the HTL;
    wherein the method further comprising removing the new material from the HTL.

10. A method for converting waste heat of exhaust gas to work while
    reducing $CO_2$ emission in the waste heat, comprising:
    feeding into a direct contact heat exchanger an exhaust gas that comprises $CO_2$ and a heat transfer liquid (HTL) that comprises molten salt thereby resulting in mixing the HTL with the exhaust gas and heating of the HTL to obtain heated HTL;
    wherein the HTL comprises a $CO_2$ capturing material, to absorb $CO_2$ from the exhaust gas, and said mixing resulting in the $CO_2$-capturing material capturing the $CO_2$ from the exhaust gas, thereby reducing an amount of $CO_2$ in the exhaust gas;
    operating an HTL-turbine for performing an isothermal or quasi-isothermal expansion with the heated HTL following said mixing; and
    producing work using the HTL-turbine;
    wherein interaction of the $CO_2$ capturing material with the $CO_2$ produces a new material which is removable from the HTL;
    wherein the method further comprises removing the new material from the HTL.

11. A method for converting waste heat of exhaust gas to work while reducing $CO_2$
    emission in the waste heat, comprising:
    feeding into a direct contact heat exchanger an exhaust gas that comprises $CO_2$ and a heat transfer liquid (HTL) that comprises molten salt, thereby resulting in mixing the HTL with the exhaust gas and heating of the HTL to obtain heated HTL;
    wherein the HTL comprises a $CO_2$ capturing material to absorb $CO_2$ from the exhaust gas, and said mixing resulting in the $CO_2$-capturing material capturing the $CO_2$ from the exhaust gas, thereby reducing an amount of $CO_2$ in the exhaust gas;

operating an HTL-turbine for performing an isothermal or quasi-isothermal expansion with the heated HTL following said mixing; and producing work using the HTL-turbine;

wherein said $CO_2$ capturing material solidifies upon absorbing $CO_2$, and the method further comprising removing the $CO_2$ capturing material which has absorbed $CO_2$ from the exhaust gas before reaching the HTL-turbine.

* * * * *